United States Patent
Ricker et al.

(10) Patent No.: US 10,642,917 B2
(45) Date of Patent: May 5, 2020

(54) METHOD AND DEVICE FOR SHARING SEGMENTED VIDEO CONTENT ACROSS MULTIPLE MANIFESTS

(71) Applicant: Triton US VP Acquisition Company, Wilmington, DE (US)

(72) Inventors: Clint Earl Ricker, Lawrenceville, GA (US); David S. Morgan, Apex, NC (US)

(73) Assignee: TRITON US VP ACQUISITION CO., Costa Mesa, CA (US)

( * ) Notice: Subject to any disclaimer, the term of this patent is extended or adjusted under 35 U.S.C. 154(b) by 290 days.

(21) Appl. No.: 15/619,938

(22) Filed: Jun. 12, 2017

(65) Prior Publication Data

US 2018/0137208 A1 May 17, 2018

Related U.S. Application Data

(60) Provisional application No. 62/421,756, filed on Nov. 14, 2016.

(51) Int. Cl.
*G06F 16/00* (2019.01)
*G06F 16/957* (2019.01)
(Continued)

(52) U.S. Cl.
CPC ........ *G06F 16/9574* (2019.01); *G06F 9/4881* (2013.01); *G06F 16/435* (2019.01);
(Continued)

(58) Field of Classification Search
None
See application file for complete search history.

(56) References Cited

U.S. PATENT DOCUMENTS 8,887,215 B2 * 11/2014 Fisher ............... H04N 21/266
725/93
8,983,076 B2 * 3/2015 Swaminathan ....... H04L 9/0819
380/278

(Continued)

OTHER PUBLICATIONS

Cisco Internet Streamer CDS 3.0 Configuration Guide, "Appendix G, ABR Session-Based Encryption and Session Tracking", OL-23609-01; pp. G1-G20.

*Primary Examiner* — Polina G Peach
(74) *Attorney, Agent, or Firm* — Fernando & Partners, LLP

(57) ABSTRACT

Segments of media content may be shared amongst multiple requesting entities in a cDVR environment. In one illustrative example, a first request to initiate recording of media content at a first start time is received from a first requesting entity. In response, a first encrypted copy of a first plurality of content segments of the media content is cached in network memory, in a first encryption window associated with a first encryption key. A first manifest including a first set of URLs is generated and sent to the first requesting entity, where URLs of the first set reference a first identifier of the first encryption window and a respective one of the content segments. If a second request to initiate recording of the media content is received from a second requesting entity at a second start time that does not exceed an interval threshold, no additional copy needs to be made. Here, a second manifest including a second set of URLs is generated and sent to the second requesting entity, where URLs of the second set also reference the first identifier of the first encryption window and a respective one of the content segments.

20 Claims, 11 Drawing Sheets

(51) Int. Cl.

| | | |
|---|---|---|
| *G06F 9/48* | (2006.01) | |
| *H04L 9/08* | (2006.01) | |
| *G06F 16/435* | (2019.01) | |
| *H04L 9/06* | (2006.01) | |
| *H04N 21/845* | (2011.01) | |
| *H04N 21/858* | (2011.01) | |
| *G06F 16/30* | (2019.01) | |

(52) U.S. Cl.
CPC ............ *H04L 9/065* (2013.01); *H04L 9/0822* (2013.01); *H04N 21/8456* (2013.01); *H04N 21/8586* (2013.01); *H04L 2209/60* (2013.01)

(56) References Cited

U.S. PATENT DOCUMENTS

| | | | |
|---|---|---|---|
| 8,997,254 B2* | 3/2015 | Amidei | H04L 63/0435 726/29 |
| 9,043,484 B2* | 5/2015 | Manzari | G06Q 30/02 709/231 |
| 9,106,943 B2 | 8/2015 | Killick et al. | |
| 9,203,816 B2* | 12/2015 | Brueck | H04N 21/2541 |
| 9,226,007 B2 | 12/2015 | Rothschild et al. | |
| 9,253,233 B2* | 2/2016 | Luby | H04N 21/23439 |
| 10,084,838 B2* | 9/2018 | Gordon | H04N 21/2662 |
| 10,085,063 B2* | 9/2018 | Hainline | H04N 21/4331 |
| 2003/0204602 A1* | 10/2003 | Hudson | H04L 67/06 709/228 |
| 2004/0254999 A1* | 12/2004 | Bulleit | H04N 7/17318 709/207 |
| 2010/0091888 A1 | 4/2010 | Nemiroff | |
| 2010/0169977 A1* | 7/2010 | Dasher | G06Q 20/3674 726/26 |
| 2011/0126248 A1 | 5/2011 | Fisher et al. | |
| 2012/0284765 A1* | 11/2012 | Killick | H04N 21/274 725/111 |
| 2013/0166906 A1* | 6/2013 | Swaminathan | H04L 65/4084 713/155 |
| 2013/0198328 A1* | 8/2013 | Green | H04L 67/02 709/217 |
| 2013/0286879 A1 | 10/2013 | Elarabawy et al. | |
| 2014/0219638 A1* | 8/2014 | Viveganandhan | H04N 5/76 386/298 |
| 2014/0229976 A1* | 8/2014 | Ma | H04N 21/231 725/32 |
| 2014/0237520 A1* | 8/2014 | Rothschild | H04N 21/236 725/88 |
| 2014/0237522 A1 | 8/2014 | Rothschild et al. | |
| 2014/0282982 A1 | 9/2014 | Rothschild et al. | |
| 2014/0337411 A1* | 11/2014 | Panje | H04L 65/60 709/203 |
| 2014/0365613 A1* | 12/2014 | Phillips | H04L 65/60 709/219 |
| 2015/0089554 A1 | 3/2015 | Phillips et al. | |
| 2015/0127845 A1* | 5/2015 | Phillips | H04L 65/601 709/231 |
| 2015/0271541 A1* | 9/2015 | Gonder | H04N 21/278 725/134 |
| 2015/0324379 A1 | 11/2015 | Danovitz et al. | |
| 2016/0112484 A1* | 4/2016 | Liu | H04L 65/4084 709/231 |
| 2016/0307596 A1* | 10/2016 | Hardin | H04L 65/40 |
| 2017/0105036 A1* | 4/2017 | Viveganandhan | H04N 21/2747 |
| 2017/0140443 A1* | 5/2017 | McGowan | G06Q 30/0277 |
| 2017/0272485 A1* | 9/2017 | Gordon | H04N 21/222 |
| 2017/0353768 A1* | 12/2017 | Muvavarirwa | H04N 21/2181 |
| 2018/0077420 A1* | 3/2018 | Dunham | H04N 19/37 |

\* cited by examiner

METHOD AND DEVICE FOR SHARING SEGMENTED VIDEO CONTENT ACROSS MULTIPLE MANIFESTS

CROSS-REFERENCE TO RELATED APPLICATION

This application claims the benefit of U.S. Provisional Patent Application No. 62/421,756, filed on Nov. 14, 2016, the contents of which are hereby incorporated by reference for all purposes.

TECHNICAL FIELD

The present disclosure relates generally to storage systems, and in particular, to systems, methods and apparatus enabling storage of video content data for multiple users.

BACKGROUND

When streaming media content for consumption by multiple users is received by a storage system, policies may indicate that a single common copy be stored for consumption by any of the users (or at least a subset of the multiple users) or that a unique copy be stored for consumption by each individual user (or at least the users not in the subset). Such policies may be based on legal requirements associated with the content, limitations of the storage system (e.g., available storage space), or other factors. Storing a unique copy of streaming media content for each user presents a number of challenges, including the storage space used in storing multiple copies of the same data.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
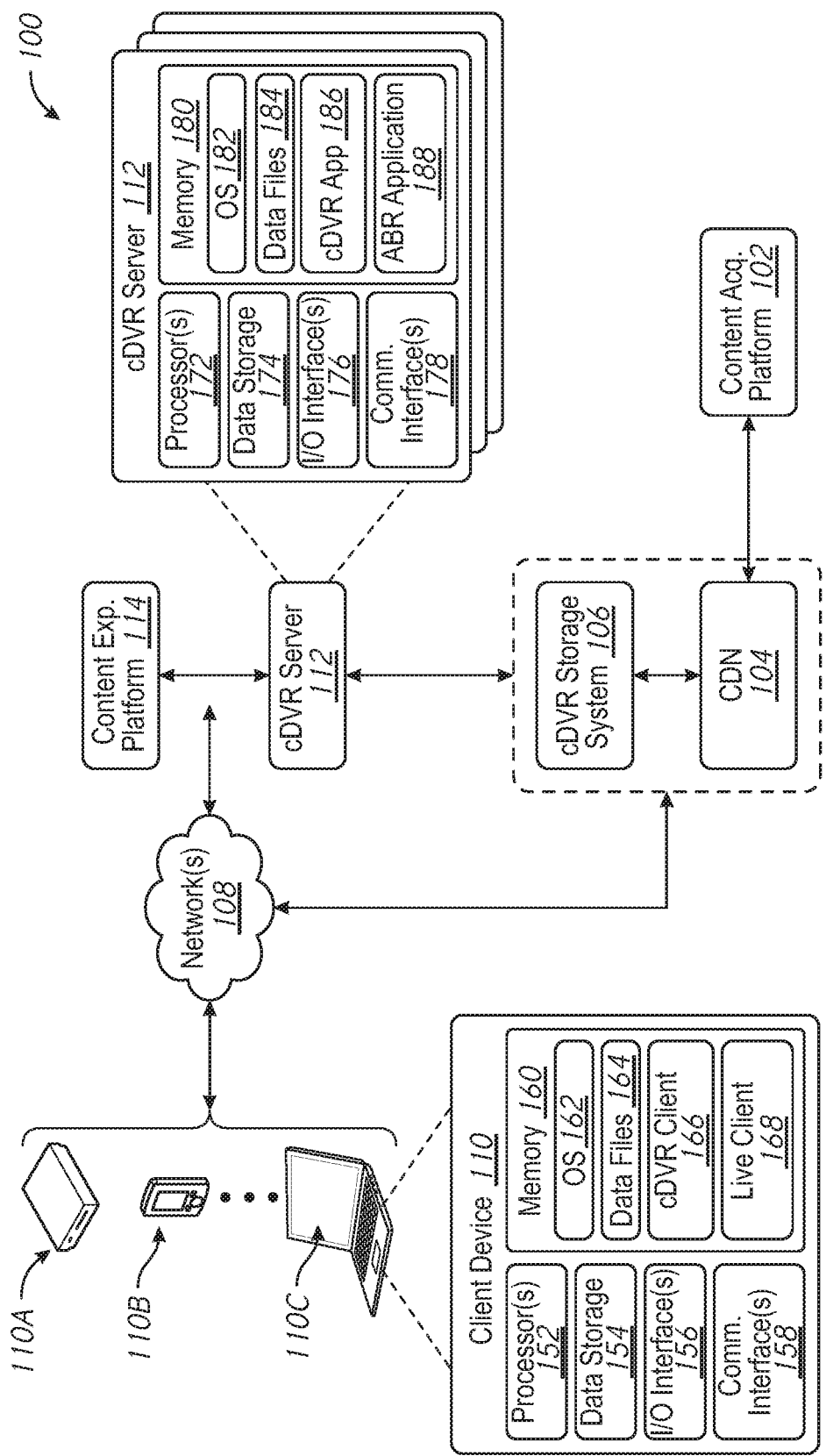
FIG. 1 is a block diagram of a cloud-based digital video recording (cDVR) operating environment in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Segments of media content may be shared amongst multiple requesting entities, for example, in a cloud-enabled/network-based digital video recording (cDVR) environment.

In one illustrative example of techniques of the present disclosure, a first request to initiate recording of media content at a first start time is received from a first requesting entity. In response to receiving the first request, a first encrypted copy of a first plurality of content segments of the media content is cached in network memory. The first encrypted copy of the first plurality of content segments is associated with a first encryption window associated with a first encryption key. A first manifest including a first set of URLs is generated and sent to the first requesting entity. The URLs of the first set are for use in retrieving content segments in a segmented video delivery, where URLs of the first set may reference a first identifier of the first encryption window and a respective one of the content segments of the first plurality.

The segmented video delivery may be facilitated in accordance with HTTP Live Streaming (HLS), HTTP Smooth Streaming (HSS), Dynamic Adaptive Streaming over HTTP (DASH), or the like. A reference to a content segment may be a relative reference, such as a reference by timestamp or sequence number. A URL may also include a reference to a representation identifier of a plurality of representations of the content segments.

Then, a second request to initiate recording of the media content at a second start time is received from a second requesting entity. On one hand, in response to receiving the second request when the second start time does not exceed an interval threshold, a second manifest including a second set of URLs is generated and sent to the second requesting entity. The URLs of the second set are for use in retrieving content segments in a segmented video delivery, where URLs of the second set may reference the first identifier of the first encryption window and a respective one of the content segments of the first plurality. In this case, content segments of the media content may be shared between the first and the second requesting entities. URLs in first and second manifests for the first and the second requesting entities may be identical for reference to the same content segments.

On the other hand, in response to receiving the second request when the second start time exceeds the interval threshold, a second encrypted copy of a second plurality of content segments of the media content is cached in the network memory. The second encrypted copy of the second plurality of content segments is associated with a second encryption window associated with a second encryption key. A third manifest including a third set of URLs is generated and sent to the second requesting entity. The URLs of the third set are for use in retrieving content segments in the segmented video delivery, where URLs of the third set may reference a second identifier of the second encryption window and a respective one of the content segments of the second plurality.

In another illustrative example of techniques of the present disclosure, a first request to initiate a first recording of media content at a first time is received. A first encryption window is associated with the first time in response to receiving the first request, where a first encryption key corresponds to the first encryption window. A first manifest for the first recording is generated based on the first encryption key and a first plurality of content segments that correspond to the first recording. The first manifest is provided to a first requesting entity associated with the first request, where the first manifest includes a first resource identifier associated with the first recording that is characterized by a first reference to a base location, a second reference to the first encryption key, and a third reference to the first recording.

Then, a second request to initiate a second recording of the media content at a second time is received. The first encryption window is associated with the second time in response to receiving the second request. A second manifest for the second recording is generated based on the first encryption key and a second plurality of content segments that correspond to the second recording. The second manifest is provided to a second requesting entity associated with the second request, wherein the second manifest includes a second resource identifier associated with the second recording that is characterized by the first reference to the base location, the second reference to the first encryption key, and a fifth reference to the second recording.

EXAMPLE EMBODIMENTS

In a cloud-enabled/network-based digital video recording (cDVR) environment, storing a unique copy of streaming media content for a plurality of users presents a number of challenges, including the storage space used in storing multiple copies of the same data. Accordingly, it is desirable to store data for multiple users using a single common copy if possible (e.g., as allowed by policy).

FIG. 1 is a block diagram of a cDVR operating environment 100 for facilitating the recording and the delivery of media content in accordance with an embodiment of the disclosure. In brief overview, a content acquisition platform (CAP) 102 may communicate with a content distribution network (CDN) 104. The cDVR storage system 106 may communicate with the CDN 104. One or more client devices 110 may communicate over one or more networks 108 with the cDVR server 112, cDVR storage system 106, and/or the CDN 104. The cDVR server 112 may communicate with a content experience platform (CEP) 114.

In some implementations, the CAP 102 may communicate with the CDN 104. The CAP 102 may comprise one or more computing devices that provide content streaming, real-time, and/or non-real-time content delivery, the delivery of stored and/or recorded content, or the like. Additionally, the CAP 102 may acquire and transcode content, segment the received content (e.g., adaptive bit-rate (ABR) technology), and/or protect and encrypt the content. In some implementations, the CDN 104 may include one or more edge servers, one or more routers and/or bridges, one or more data center servers, one or more content databases, and/or one or more content servers. The various elements of the CDN 104 may cooperate to receive content from the CAP 102 and appropriately cache the content and/or transmit the content to a destination, such as the cDVR storage system 106 for access by one or more client devices 110.

In some implementations, the CDN 104 may be in communication with one or more cDVR storage systems 106. The cDVR storage system 106 may store records associated with user accounts and any content assets that may be associated with the user accounts. The cDVR storage system 106 may be paired with an edge server of the CDN 104. In some implementations, the cDVR storage system 106 may be managed as part of the CDN 104 or may be considered a separate component of the cDVR operating environment 100.

In some implementations, the cDVR storage system 106 may be located between the edge of the CDN 104 and target markets (e.g., the client devices 110). In some implementations, one or more cDVR storage systems 106 may be placed with the CDN 104, minimizing impact to the network transport. In some implementations, the cDVR storage system 106 may retrieve content from the CDN 104.

In some implementations, one or more client devices 110 may communicate over one or more networks 108 with the cDVR server 112, the cDVR storage system 106, and/or the CDN 104. Suitable client devices 110 may include, but are not limited to, a set top-box (STB) 110A, smartphones 110B, laptop computers 110C, tablets, electronic book reading devices, processor-based devices, or the like.

In some implementations, the one or more client devices 110 may communicate with the cDVR server 112, the cDVR storage system 106, and/or the CDN 104 over one or more types of networks 108, such as a wireless fidelity (Wi-Fi) network, a Wi-Fi Direct network, BLUETOOH, a radio network, a cellular network (e.g., third generation or fourth generation), a satellite network, a cable network, a landline-based network, the Internet, intranets, a telephone network, a television network, data networks, or other communication mediums connecting multiple computing devices to one another, as non-limiting examples.

In some implementations, the one or more client devices 110 may each include one or more processors 152, one or more memories 160, data storage 154, one or more input/output (I/O) interfaces 156, and one or more communication interfaces 158. The one or more processors 152 may individually comprise one or more cores and may be configured to access and execute, at least in part, instructions stored in the one or more memories 160. The one or more memories 160 comprise one or more non-transitory computer readable storage media (CRSM). The one or more memories 160 may include, but are not limited to, random access memory (RAM), flash RAM, magnetic media, optical media, and so forth. The one or more memories 160 may be volatile in that information is retained while providing power or nonvolatile in that information is retained without providing power.

In some implementations, the one or more client devices 110 may each further include additional data storage 154 such as removable storage and/or non-removable storage including, but not limited to, magnetic storage, optical disk storage, and/or tape storage. In some implementations, the data storage 154 may provide non-volatile storage of computer-executable instructions and other data. The memory 160 and/or the data storage 154, removable and/or non-removable, are examples of CRSM.

In some implementations, the one or more I/O interfaces 156 may also be provided in the client device 110. These I/O interfaces 156 allow for coupling devices, such as keyboards, joysticks, touch sensors, cameras, microphones, speakers, haptic output devices, memories, and so forth, to the client device 110.

In some implementations, the one or more communication interfaces 158 provide for the transfer of data between the client device 110 and another device directly, via a network, or both. In some implementations, the communication interfaces 158 may include, but are not limited to, personal area networks (PANs), wired local area networks (LANs), wireless local area networks (WLANs), wireless wide area networks (WWANs), and so forth. The one or more communication interfaces 158 may utilize acoustic, radio frequency, optical, or other signals to exchange data between the one or more client devices 110 and another device such as an access point, a host computer, a router, an e-reader device, another one of the one or more client devices 110, and the like.

In some implementations, the one or more memories 160 may store instructions for execution by the processor 152 to perform certain actions or functions. These instructions may include an operating system (OS) 162 configured to manage hardware resources, such as the I/O interfaces 156, and provide various services to applications executing on the processor 152. The one or more memories 160 may also store data files 164 containing information about the operating system 162.

In some implementations, a cDVR client 166 may be stored in the one or more memories 160. The cDVR client 166 may receive or access information associated with the cDVR operating environment 100. In some implementations, the cDVR client 166 may communicate over one or more networks 108 with the cDVR server 112 and/or the cDVR storage system 106. In some implementations, the memory 160 has stored therein manifest data accessible to the cDVR client 166, where the manifest data is provided to allow the client device 110 to specify content segments when requesting recorded media data.

In some implementations, a live client 168 may be stored in the one or more memories 160. The live client 168 may receive information collected or generated by the cDVR client 166. In some implementations, the live client 168 may be in communication over one or more networks 108 with the CDN 104.

According to some implementations, one or more modules may be stored within the one or more memories 160. As used herein, the term module designates a functional collection of instructions that may be executed by the one or more processors 152. For convenience in description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

In some implementations, the cDVR server 112 may communicate with the cDVR storage system 106 to create user records and/or directories, create asset records and/or directories, create and store manifest files, place entries in the cDVR storage system 106 for each one or more segment time periods to be recorded and/or stored, change the state of the asset (e.g., change the state associated with the asset record to "recording" after receiving the first media segment, change the state associated with the asset record to "recorded" after receiving the last media segment for the content asset), calculate asset-specific quota data, associate entitlement checking data, and/or schedule and perform quality control for content assets. In some implementations, the cDVR server 112 may also comprise record events for functionality associated with the cDVR operating environment 100, such as scheduling recordings, quality control checks, entitlement checks, validation checks, and/or the like.

In some implementations, the one or more cDVR servers 112 may each include one or more processors 172, one or more memories 180, data storage 174, one or more input/output (I/O) interfaces 176, and one or more communication interfaces 178. The one or more processors 172 may individually comprise one or more cores and may be configured to access and execute, at least in part, instructions stored in the one or more memories 180. In some implementations, the one or more memories 180 comprise one or more non-transitory CRSM. The one or more memories 180 may include, but are not limited to, RAM, flash RAM, magnetic media, optical media, and so forth. The one or more memories 180 may be volatile in that information is retained while providing power or non-volatile in that information is retained without providing power.

In some implementations, the cDVR server 112 may further include additional data storage 174 such as removable storage and/or non-removable storage including, but not limited to, magnetic storage, optical disk storage, and/or tape storage. Data storage 174 may provide non-volatile storage of computer executable instructions and other data. The memory 180 and/or the data storage 174, removable and/or non-removable, are examples of CRSM.

In some implementations, the one or more I/O interfaces 176 may also be provided in the cDVR server 112. These I/O interfaces 176 allow for coupling devices, such as keyboards, joysticks, touch sensors, cameras, microphones, speakers, haptic output devices, memories, and so forth, to the cDVR server 112.

In some implementations, the one or more communication interfaces 178 provide for the transfer of data between the cDVR server 112 and another device directly, via a network, or both. The communication interfaces 178 may include, but are not limited to, PANs, LANs, WLANs, WWANs, and so forth. The communication interfaces 178 may utilize acoustic, radio frequency, optical, or other signals to exchange data between the cDVR server 112 and another device such as a client device 110, another cDVR server 112, an cDVR storage system 106, or the like.

In some implementations, the one or more memories 180 may store instructions for execution by the processor 172 to perform certain actions or functions. These instructions may include an operating system (OS) 182 configured to manage hardware resources, such as the I/O interfaces 176, and provide various services to applications executing on the processor 172. The one or more memories 180 may also store data files 184 containing information about the operating system 182.

According to some implementations, a cDVR application 186 may be stored in the one or more memories 180. The cDVR application 186 may receive requests from one or more client devices 110, schedule recordings, perform validation checks, perform quality control checks, and other cDVR functionality. In some implementations, the cDVR application 186 may communicate over one or more networks 108 with an cDVR storage system 106, one or more client devices 110, or other devices in the cDVR operating environment 100.

In some implementations, an adaptive bit-rate (ABR) application 188 may be stored in the one or more memories 180. The ABR application 188 may receive information associated with the network connection quality and/or the client device 110 to determine an adaptive bit-rate associated with the client device 110. The ABR application 188 may determine an optimal set of bitrates associated with a particular device class associated with the client device 110 based at least in part on the information associated with the client device 110, the information associated with the network connection quality of the client device 110, the received request from the client device 110, and/or a user account profile associated with the client device 110.

According to some implementations, one or more modules may be stored within the one or more memories 180. As used herein, the term module designates a functional collection of instructions that may be executed by the one or more processors 172. For convenience in description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

In some implementations, the cDVR server 112 may be in communication with a content experience platform (CEP) 114. The CEP 114 may provide guide data (e.g., linear video metadata management), application interface servers (e.g., API servers or "app servers" for linear and on-demand services), and/or a content and service protection platform (e.g., a combination of privacy, network security, conditional access, and content protection of digital rights components).

In some implementations, the cDVR operating environment 100 may be associated with an ABR live-video distribution system. The ABR live-video distribution system may comprise a CAP 102, a CDN 104, a CEP 114, and one or more client devices 110. The cDVR cloud storage may comprise one or more cDVR storage arrays 106 and one or more cDVR servers 112. The cDVR cloud storage may process transport streams of live content, wherein the processing may include encoding, transcoding, and rate-shaping of transport streams.

In some implementations, the cDVR server 112 may manage source data, which may describe where the source is located, and any information that may be requested by a user in association with the content asset (e.g., rating information for the content asset, duration of the asset, date the content asset was recorded, and the like). For example, in some implementations, the cDVR server 112 may store the "current" segment duration for each of one or more sources (e.g., CDN 104 server). In some implementations, other characteristics may also be stored in association with the content asset. The cDVR server 112 may store information indicating whether the segment should be stored in a manner so that a user may receive a copy of the segment or if a segment may be shared by multiple users.

In some implementations, the cDVR client 166 may generate and transmit a request to the cDVR application 186 for a list of content assets associated with the user account associated with the client device 110. The cDVR application 186 may retrieve or otherwise obtain information from the cDVR storage system 106 and generate a list of all assets associated with the user account and metadata associated with the content assets. For example, the metadata may include, but is not limited to, availability of the content asset, quota information associated with the content asset, or the like. In some implementations, the list of the content assets associated with a user account, recording state, and quota information may be compiled and transmitted to the cDVR client 166 of a client device 110.

Figure 2:
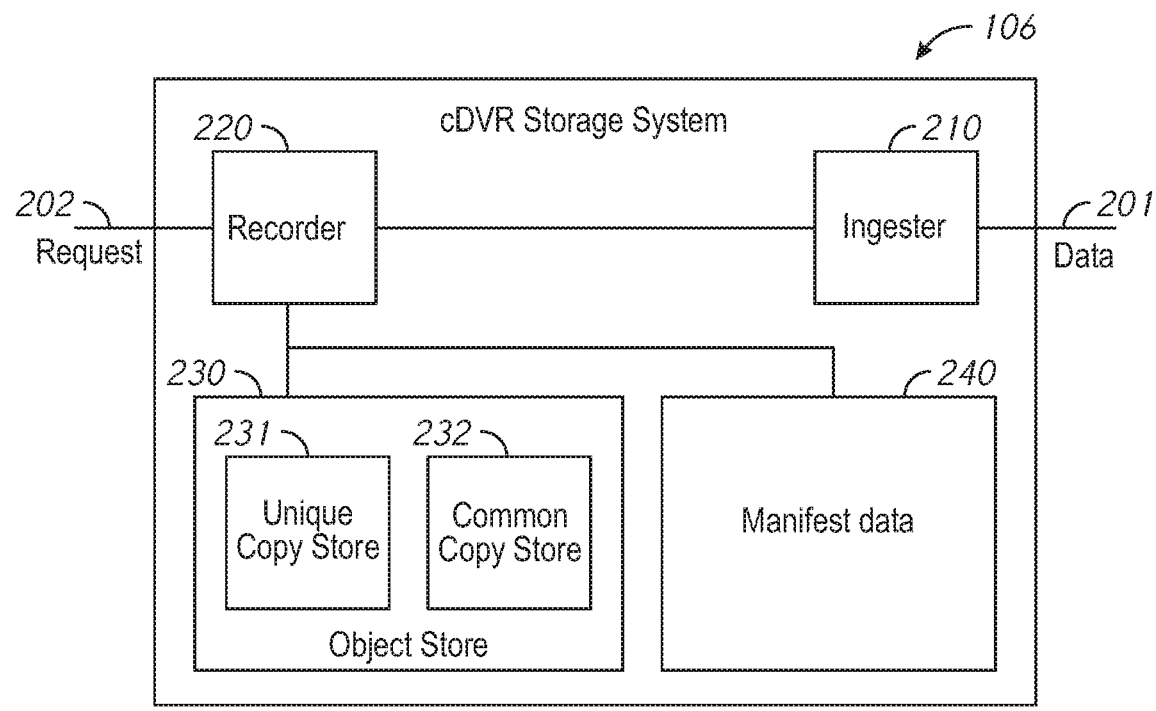
FIG. 2 is a block diagram of a cDVR storage system in accordance with some implementations.

FIG. 2 is a block diagram of the cDVR storage system 106 according to some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, the cDVR storage system 106 includes an ingester module 210 that receives data 201, a recorder module 220 that receives requests 202 to store the data 201 for a user, an object store 230 that stores the data 201, and manifest data 240. The object store 230 includes a number of storage locations at which objects can be stored. The object store 230 can store, among other things, a unique copy of the data 201 for each of one or more requesting users and a common copy of the data 201 that is shared between the number of requesting users. In some implementations, the manifest data 240 includes master manifest files for each of one or more recordings.

At least some or all of the modules 210, 220, 230, 240 of the cDVR storage system 106 can be implemented on the same or separate computing devices. In some implementations, the object store 230 can be a distributed object store including multiple computing devices networked over multiple locations.

Figure 3:
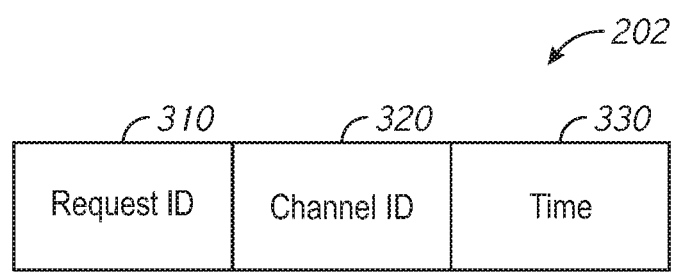
FIG. 3 is a block diagram of a recording request in accordance with some implementations.

In some implementations, the cDVR storage system 106 is configured to store video data associated with multicast (e.g., broadcast) content and, thus, acts as a digital video recorder (DVR). As an example, a user can use the cDVR storage system 106 to record a television program within the storage system and watch the television program at a time later than the broadcast time. To that end, the recorder module 220 receives a recording request 202 from a user indicating that the user desires to record a particular television program. As shown in FIG. 3, the recording request 202 can include a recording request identifier (ID) 310, a channel ID 320, and temporal data 330 indicative of a time span of the recording.

The recording request ID 310 (referred to as a "request ID") can be a unique identifier associated with a recording request. For example, the request ID 310 can be a UUID (universally unique identifier). In some implementations, the request ID 310 includes a user ID or, at least, indicates a user identifier or user device (such as a set-top box).

The channel ID 320 can be an identifier that indicates a broadcast channel or sub-channel (also referred to as profiles). In some implementations, a broadcast channel can include sub-channels with multiple versions of the same broadcast. For example, the broadcast channel can include sub-channels (also referred to as channels) with video data at different bitrates or with different audio/subtitles. Thus, in some implementations, the channel ID 320 indicates a broadcast channel and the recording request 202 further includes data indicating the sub-channel or profile. In some implementations, the channel ID 320 indicates the sub-channel or profile.

In various implementations, the temporal data 330 can indicate the time span of the recording in a variety of ways. In some implementations, the temporal data 330 indicates a start time and an end time of the recording. In some implementations, the temporal data 330 indicates a start time and a recording length of the recording. In some implementations, the temporal data 330 indicates one or more standard programming slots (e.g., 8:00 pm to 8:30 pm and 8:30 pm to 9:00 pm) and the recorder module 230 determines the time span of the recording based on the programming slot.

In response to receiving the recording request 202, the recorder module 220 instructs the ingester module 210 to receive (or retrieve) data 201 from the indicated channel (or sub-channel) during the time span and return the data 201 to the recorder module 220. When received from the ingester module 210, the recorder module 220 stores the data 201 in the object store 230 for later access for the user according to a storage policy.

When multiple users submit requests to store the same data (e.g., record the same content), the recorder module 220 can handle the multiple requests in a number of ways to improve efficiency of the cDVR storage system 106. For example, the recorder module 220 can receive a first recording request (having a first request ID, a channel ID, and temporal data) and a second recording request (having a second request ID, the same channel ID, and the same, or at least overlapping, temporal data).

In some implementations, the recorder module 220 receives the data from the ingester module 210 and, for a given recording request, instructs the object store 230 to store a unique copy of the data as a separate object in the object store 230. For example, the recorder module 220 can submit a first PUT command to the object store 230 including the data and can further submit a second PUT command to the object store 230 including the second request ID and the data. The recorder module 220 can store metadata associating the first request ID with the object created by the first PUT command and associating the second request ID with the object created by the second PUT command.

However, such implementations may be inefficient for large numbers of recordings. Nevertheless, storage policy may dictate that such an implementation be employed for at least some recording requests. Such implementations include multiple PUT commands from the recorder module 220 increasing the overhead of the signaling. Such implementations also include the recorder module 220 pushing identical data to the object store 230 multiple times, inefficiently using network bandwidth and increasing the overhead of transport. Further, creation of a large number of objects can create a sizable amount of metadata to be managed by the recorder module 220.

Thus, in some implementations, the recorder module 220 receives the data from the ingester module 210 and instructs the object store 230 to store a common copy of the data as a single object in the object store 230. The recorder module 220 can store metadata associating the first request ID with the object created by the PUT command and associating the second request ID with the same object.

When the two requests reference overlapping times, but not the same time, the recorder module 220 can, in some implementations (as described above) create a unique copy for each request. In some implementations, the recorder module can create a copy from the earliest start time to the latest end time. For example, if the first request indicated 7:59 pm to 8:30 pm and the second request indicated 8:00 pm to 8:35 pm, the recorder module 120 can store an object including the content between 7:59 pm and 8:35 pm. Further, the recorder module 220 can include bookmarks in the content that represent the requested subsections of a request.

In some implementations, the data 201 received by recorder module 220 is video data broken into segments of approximately 2 seconds. In some implementations, the segments may be other lengths of time, e.g., between approximately 2 seconds and 10 seconds. In some implementations, the data 201 is received by the ingester module 210 as segments. In some implementations, the data 201 is converted by the ingester module 210 into segments before being sent to the recorder module 220.

Thus, in some implementations, in response to receiving a recording request, the recorder module 220 creates a database record including the request ID, data indicative of the channel (or sub-channel or other source), data indicative of the start time and end time, and data indicative of a storage policy. The storage policy can signal directives such as common/unique copy storage per user, resiliency, and so forth. In particular, the storage policy can indicate whether a unique copy of the content is to be stored for the user or whether a common copy of the content to be stored can satisfy the recording request. The storage policy can be based on a number of factors, such as the location of the requestor of the recording request (e.g., the user), the source of the content, the nature of the content (e.g., educational or public domain), or rights to the content.

In response to receiving a segment from the ingester module 210, the recorder module 220 determines whether there is at least one recording scheduled for the segment (e.g., whether the time of the segment is between the start time and end time of a database record indicating the source of the segment).

If so, the recorder module 220 will write the segment to the object store 130. In some implementations, the recorder module 220 stores a unique copy of the segment for a recording scheduled for the segment with a storage policy indicating storage of a unique copy. Further, the recorder module 220 stores a common copy of the segment if there is at least one recording scheduled for the segment with a storage policy indicating storage of a common copy.

In some implementations, the recorded segments are written to the object store 230 using deterministic key names such that a particular segment can be retrieved by the channel ID, start time, and end time. Alternatively, in some implementations, the recorder module 220 can store a lookup table associating segment information (e.g., channel ID, start time, and end time) to an object identifier of the object store 230. In some implementations, the table can, instead or additionally, be stored in the object store 230.

When the recorder module 220 receives a read request for a particular recording request (e.g., a read request indicating a request ID), the recorder module 220 reads the database to determine the channel ID, start time, and time for the recording request. The recorder module 220 determines a set of objects to retrieve from the object store 230 (either using the lookup table or heuristics based on the deterministic key names). The recorder module 220 reads the set of objects from the object store 230 and returns them in response to the read request.

In some implementations, when a recording deletion request indicating a request ID is received by the recorder module 220, the recorder module 220 removes the request ID from its database (or marks it deleted, invalid, or inactive). Thus, such a recording request (or record in the database) is not considered when determining whether or how to store a received segment. Further, the recorder system 220 can periodically delete stored segments that are not referenced by any active recording requests in the database.

In some implementations, the recorder module 220 can receive a record modification request to modify the start time and end time of a recording request stored in the database. If the segments indicated by the modified start time and end times of the record modification request are stored in the object store, the recorder module 220 indicates that the request was successful and modifies the record of the database to include the modified start time and end time. Thus, a user can modify the timespan of a recording even after the start time and/or the end time of the recording has passed.

Figure 4:
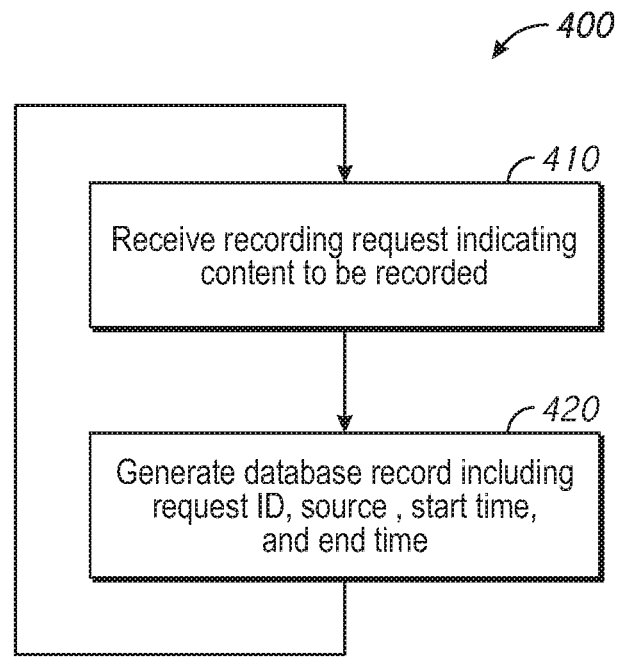
FIG. 4 is a flowchart representation of a method of handling a recording request in accordance with some implementations.

FIG. 4 is a flowchart representation of a method of handling a recording request in accordance with some implementations. In some implementations (and as detailed below as an example), the method 400 is performed by a recorder module, such as the recorder module 220 of FIG. 2. In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, the method 400 includes receiving a recording request and generating a database record corresponding to the recording request.

The method 400 begins, in block 410, with the recorder module receiving a recording request indicating content to be recorded. In some implementations, the recording request includes data indicative of a source (e.g., a channel or sub-channel) and temporal data indicative of a time span of the recording. As noted above, the temporal data can indicate the time span of the recording in a number of ways.

At block 420, in response to receiving the recording request, the recorder module 420 generates a database record in a recordings database including a request ID, a source ID, data indicative of a start time, data indicative of an end time, and data indicative of a storage policy. In various implementations, the data indicative of the start time and end time can be stored as temporal data in a variety of ways. In some implementations, the recording request includes the request ID. In some implementations, the recorder module assigns the request ID to the recording request and, optionally, returns the request ID to the requestor.

In some implementations, generating the database record includes determining a storage policy for the recording request. In particular, the storage policy can indicate whether a unique copy of the content is to be stored for the user or whether a common copy of the content to be stored can satisfy the recording request. The storage policy can be based on a number of factors, such as the location of the requestor of the recording request (e.g., the user), the source of the content, the nature of the content (e.g., educational or public domain), or rights to the content.

Following block 420, the method 400 returns to block 410 where additional recording requests can be received by the recorder module.

Figure 5:
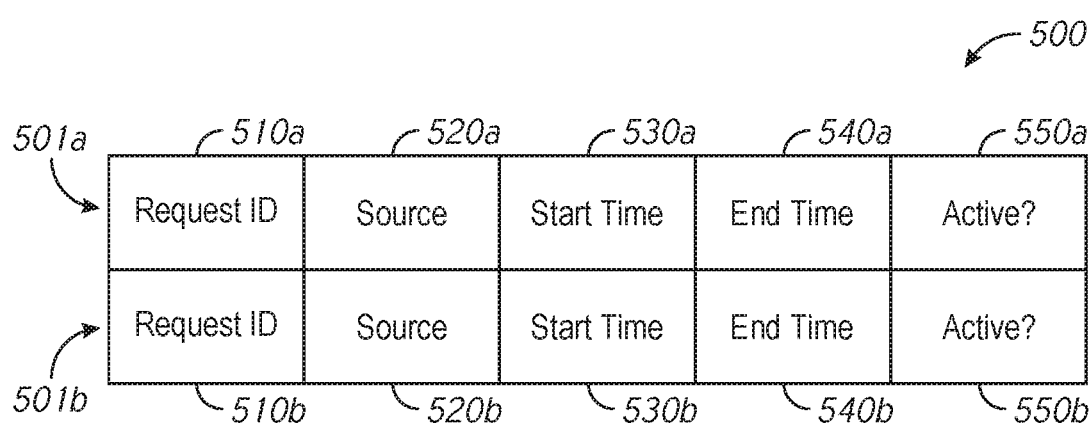
FIG. 5 is a block diagram of an example recordings database in accordance with some implementations.

FIG. 5 is a block diagram of an example recordings database in accordance with some implementations. As shown in FIG. 5, the recordings database 500 includes a plurality of records 501*a*-501*b*. Although only two records 501*a*-501*b* are illustrated in FIG. 5, it is to be appreciated that the recordings database 500 can include any number of records. Each one or more records 501*a*-501*b* includes a request ID field 510*a*-510*b* that stores a request ID, a source field 520*a*-520*b* that stores data indicative of a source (e.g., a channel ID) of a recording, a start time field 530*a*-530*b* that stores data indicative of a start time of the recording, an end time field 540*a*-540*b* that stores data indicative of an end time of the recording, a policy field 550*a*-550*b* that stores data indicative of a storage policy and an active field 560*a*-560*b* that stores a flag indicative of whether or not the record is active.

Figure 6:
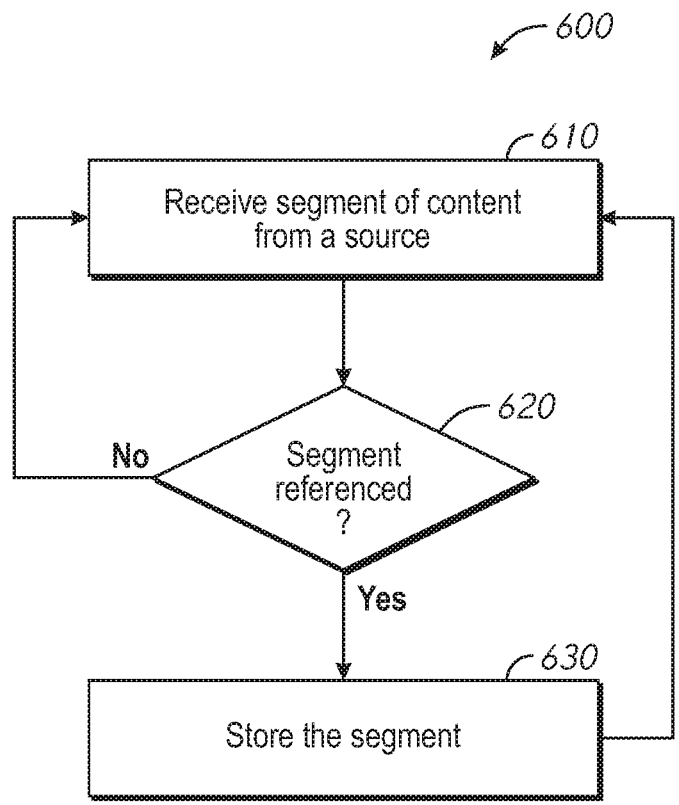
FIG. 6 is a flowchart representation of a method of handling a received segment in accordance with some implementations.

FIG. 6 is a flowchart representation of a method of handling a received segment in accordance with some implementations. In some implementations (and as detailed below as an example), the method 600 is performed by a recorder module, such as the recorder module 220 of FIG. 2. In some implementations, the method 600 is performed by processing logic, including hardware, firmware, software, or a combination thereof. In some implementations, the method 600 is performed by a processor executing code stored in a non-transitory computer-readable medium (e.g., a memory). Briefly, the method 600 includes receiving a segment and, if the segment is referenced by an active record, storing the segment.

The method 600 begins, in block 610, with the recorder module receiving a segment of content from a source. In some implementations, the recorder module receives the segment from an ingester module which receives (or retrieves) the segment from the source.

At block 620, the recorder module determines whether the segment is referenced by any active record in a recordings database (e.g., the recordings database 500 of FIG. 5). In particular, the segment can include metadata indicative the source of the segment and a time of the segment. If the source metadata of the data matches the source field 520*a*-520*b* of an active record and the time of the segments falls within the start time and end time of the record, the segment is referenced by an active record and the method 500 continues to block 630. If not, the method 600 returns to block 610 where additional segments are received from the source (and/or other sources).

At block 630, the recorder module stores the segment. In some implementations, the recorder module stores the segment in an object store. In some implementations, storing the segment includes storing the segment in the object store using a deterministic key name based on the source of the segment and the time of the segment (e.g., using the metadata). In some implementations, storing the segment includes storing the source of the segment and the time of the segment (e.g., the metadata) in a lookup table in association with an object ID of the object stored on the object store containing the segment.

In some implementations, the recorder module stores a unique copy of the segment for a active record that references the segment and has a storage policy indicating storage of a unique copy. In some implementations, the recorder module stores a common copy of the segment if any active record references the segment and has a storage policy indicating storage of a common copy.

Following block 630, the method 600 returns to block 610 where additional segments can be received by the recorder module from the source and/or other sources.

Figure 7:
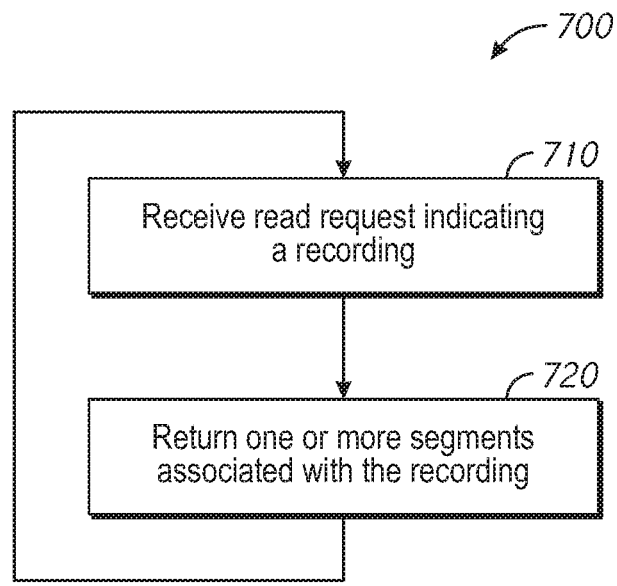
FIG. 7 is a flowchart representation of a method of handling a read request in accordance with some implementations.

FIG. 7 is a flowchart representation of a method of handling a read request in accordance with some implementations. In some implementations (and as detailed below as an example), the method 700 is performed by a recorder module, such as the recorder module 220 of FIG. 2. In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, the method 700 includes receiving a read request indicating a recording and returning one or more segments associated with the recording.

The method 700 begins, in block 710, with the recorder module receiving a read request indicating a recording. At block 720, in response to receiving the read request, the recorder module returns one or more segments associated with the recording. Following block 720, the method 700 returns to block 710 where additional read requests can be received by the recorder module.

In some implementations, the read request includes a request ID and the recorder module locates a record in a recordings database having the request ID of the read request stored in a request ID field. The recorder module then retrieves (from the object store) segments referenced by the record (or at least those that have been recorded) and returns (to the requestor) the retrieved segments.

Figure 8:
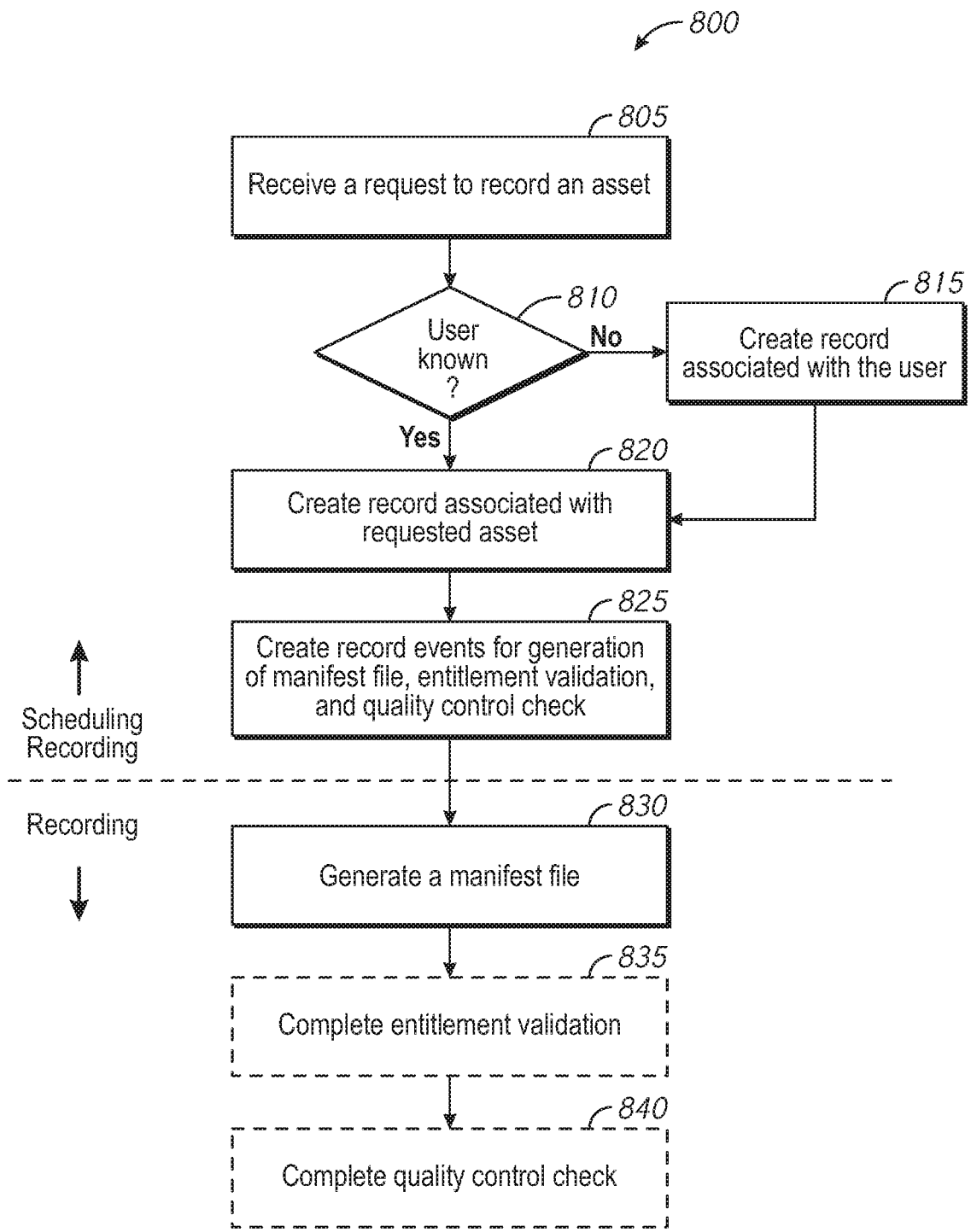
FIG. 8 is flowchart representation of a method of scheduling a recording in the cDVR operating environment in accordance with some implementations.

FIG. 8 is a flow diagram of a method 800 for scheduling a recording in the cDVR operating environment 100 in accordance with some implementations. In brief overview, at block 805, a request may be received to record an asset. At block 810, a determination may be made whether a user is known in the cDVR operating environment 100. If the user is not known, then at block 815, a record associated with the user may be created. If the user is known, at block 820 a record associated with the requested asset may be created. At block 825, record events may be created for events, such as, but not limited to, the generation of a manifest file associated with the asset, the completion of an entitlement validation associated with the asset for the user, and the completion of a quality control check associated with the asset. At block 830, a manifest file may be generated. At block 835, an entitlement validation associated with the asset for the user may be completed. At block 840, a quality control check associated with the asset may be completed. In some implementations, blocks 805-825 may be associated with scheduling a recording of a content asset. In some implementations, blocks 830-840 may be associated with recording a content asset.

At block 805, a request may be received to record a content asset. The request may be received from a client device 110 associated with a user account. The request may include one or more of a user identifier (ID), a source and/or channel ID, a start time associated with a content asset, and the duration associated with the content asset. In some implementations, the source ID may be in the form of a uniform resource identifier (URI) or uniform resource locator (URL).

At block 810, a determination is made whether a user is known in the cDVR operating environment 100. In some implementations, the cDVR server 112 may check the cDVR storage system 106 to determine if the user is known in the cDVR operating environment 100. In some implementations, the cDVR server 112 may check to see if a record or a directory associated with the user exists. The cDVR server 112 may use the user identifier received in the request to determine if a user is known in the cDVR operating environment 100. In some implementations, the cDVR server 112 may determine if the user ID is associated with multiple users. In some implementations, multiple people at a customer residence may use the cDVR operating environment 100. A single person may be designated as the main user, but other users may be associated with the main user. For example, if a household comprises a family with two adults and three children, one adult may be designated as the main user and have a home directory associated with the main user. Associated users, such as the other adult and the children, may have affiliated user accounts. In a multi-user account, there may be account-level and user-level content, as well as content-specific and feature-specific parental controls, described below.

If the user is not known, then at block 815, a record associated with the user may be created in the cDVR operating environment 100 (e.g., by the cDVR storage system 106). In some implementations, a directory associated with the user may be created. In some implementations, the cDVR server 112 may create a directory for affiliated users within or in association with the directory of the main user account. In some implementations, an asset directory for the requested asset may exist. For example, if a user is requesting to schedule an episode of a television show, an asset directory may exist for the series. The cDVR server 112 may create a record or directory for the specific content asset (e.g., television episode) as shown in FIG. 5.

If the user is known, at block 820 a record associated with the requested asset (e.g., asset record) may be created. The record associated with the requested asset may comprise information on the source of the content (e.g., in the form of a URI), a recording state, and an allocated portion of the quota for the user account. The allocated portion of the quota may be a descriptor and a value. In some implementations, the asset record may comprise a state field, which may be set to "scheduled."

At block 825, the cDVR server 112 may create record events for events, such as, but not limited to, the generation of a manifest file associated with the asset, the completion of an entitlement validation associated with the asset for the user, and the completion of a quality control check associated with the asset. In some implementations, record events may be stored in the cDVR storage system 106 the cDVR server 112, an cDVR database associated with the cDVR server 112, and/or other entity within the cDVR operating environment 100 in association with the asset record.

Although blocks 830, 835, and 840 appear in FIG. 8 in sequential order, it should be noted that blocks 830, 835, and 840 may occur in different orders and their execution is not dependent upon each other.

At block 830, a manifest file may be generated. The manifest file may, in one aspect, provide information related to identifying the segments of media content for the client device 110 to acquire and sequencing those segments. Therefore, the manifest file may provide a sequential listing of files that the client device 110 needs to receive from the CDN 104 to correctly render media content to the one or more users.

According to some implementations, the manifest file, sometimes referred to as a playlist, may include information pertaining to segments of media that are to be streamed to the client device 110 to provide the media programming that is requested by the user. In other words, the manifest file, when provided to the client device 110, allows the client device 110, and more particularly, the one or more processors, to access segments of media from the CDN 104 in a particular sequence as indicated in the manifest file to provide complete media content to the user of the client device 110. For example, an N-minute media content or programming may be partitioned into X media segments. In one aspect, the manifest file provided to the client device 110 may include information associated with accessing the X media segments in the correct order to provide complete media content to the user.

In some implementations, a process associated with the cDVR server 112 may scan the cDVR storage system 106 at pre-determined intervals or responsive to triggering events to identify one or more record events which may trigger the generation of a manifest file for an asset. The manifest file associated with the asset may be generated prior to the airing or broadcast of the asset. The manifest file associated with the asset may be generated in near proximity to the beginning of the recording of the asset. The manifest file may be stored in the user directory in the cDVR storage system 106 of the requesting user. The manifest file may use the current segment duration for calculating the names of the expected media segments and use time boundaries to determine key references. After the manifest file is created, the record event for generation of the manifest file may be removed from the cDVR storage system 106. Further details for generation of a manifest file are discussed below in relation to FIG. 9.

At block 835, an entitlement validation associated with the asset for the user may optimally be completed in accordance with some implementations. An entitlement validation may ensure that a user is entitled to the content asset at the time it is aired or broadcast. Entitlement to the content asset may not be required to schedule a recording. If a user was entitled to the content asset and it was recorded, the user may play back the content even if the user is no longer entitled to the content asset. A process associated with the cDVR server 112 may check for entitlements for scheduled recordings during the recording period. If the user is not entitled to the recording, any recorded content may be removed from the user directory, and the schedules for recording future portions of the content may be removed. Once a content asset has been validated by the process, the asset record may be updated (e.g., the state of the asset record may be changed to "recorded") to reflect that playback is available for that asset. Content may not be available for playback until the entitlement validation has been completed. Once an entitlement validation for an asset has been completed, the record event associated with the entitlement validation may be removed from the cDVR storage system 106.

At block 840, a quality control check associated with the asset may be optionally completed in accordance with some implementations. When recordings occur but have not been validated, they may be flagged to initiate a quality control process for the recording. The quality control process may traverse the manifest file and check the files, updating the manifest file to provide for any corrections. For example, modifications to the manifest file may be provided if segment boundary times have changed. Additionally, missing segments may be concealed with alternate bandwidth versions or concealer segments (e.g., segments displaying a message, such as "Locating your video . . . "). Once a quality control check for an asset has been completed, the record event associated with the quality control check may be removed from the cDVR storage system 106.

In some implementations, a user, or an agent on behalf of a user, may schedule a series recording for content (e.g., television series). The client device 110 may transmit a request to the cDVR server 112 to schedule a series recording. The request may include a user ID, a series ID, a specified pre-roll (e.g., the time period prior to the scheduled airing of the asset), post-roll (e.g., the time period after the scheduled airing of the asset), and/or flags for various attributes of the content assets to be recorded. Flags for various attributes of the content assets may include flags for the format of the asset (e.g., high definition (HD) or standard definition (SD)), a specific source of the content asset (e.g., specifying a particular broadcast or cable channel), type of airing (e.g., first run of the content asset or reruns of the asset), or number of assets to record or maintain in the user directory.

In some implementations, the cDVR server 112 may comprise an adaptive bit-rate (ABR) application 188 which may process a given media segment. The adaptive bit-rate module may learn about the bit-rate and profile versions available for a given segment and may keep track of the current set of files. In some implementations, the ABR application 188 may monitor expected segment duration and alert quality control if a segment duration has changed. The ABR application 188 may obtain a list of assets that meet a given list of criteria. For example, the ABR application 188 may identify records that have an associated state of either "scheduled" or "recording" and the start-time is within the segment duration of the current time or has already passed.

Figure 9:
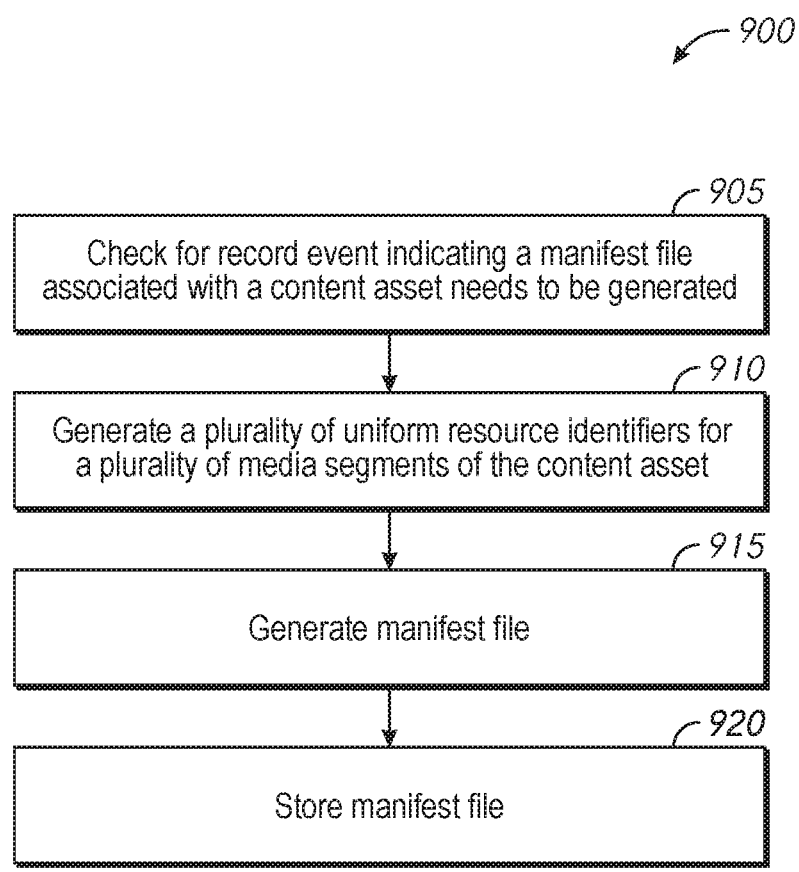
FIG. 9 is flowchart representation of a method of generating a manifest file for playback in the cDVR operating environment in accordance with some implementations.

FIG. 9 is a flow diagram of a method 900 for generating a manifest file for playback in the cDVR operating environment 100 in accordance with some implementations. At block 905, a process associated with the cDVR application 186 may check for record events which may trigger the generation of a manifest file associated with a content asset. At block 910, the process may generate a plurality of uniform resource identifiers (URIs) or uniform resource locators (URLs) for a plurality of media segments of the content asset and store them in the manifest file. At block 915, the process may generate the manifest file. At block 920, the process may store the manifest file in the asset directory of the cDVR storage system 106 associated with the requesting user.

At block 905, a process associated with the cDVR application 186 may check for record events which may trigger the generation of a manifest file associated with a content asset. In some implementations, the process associated with the cDVR application 186 may check for one or more record events at predetermined time intervals. For example, the process may scan the cDVR server 112 or a database associated with the cDVR server 112 containing the records associated with scheduled recordings. The process may scan to identify one or more record events which may trigger the generation of a manifest file or files. The process may scan or check for record events at predetermined time intervals, which in some implementations, may be set by an administrator of the cDVR operating environment 100. The scanning or checking for record events at predetermined time intervals may be independent of the recording of the content asset. In some implementations, the process associated with the cDVR application 186 may check for record events responsive to a triggering event (e.g., receiving an indication that a content asset is being broadcast or aired).

In some implementations, the record event may have been created by the cDVR server 112 when the content asset was scheduled to be recorded. In some implementations, the cDVR server 112 may generate a record event responsive to a user request to schedule a recording. In some implementations, the cDVR server 112 may generate a record event response to a series recording event. In some implementations, the record event associated with generating a manifest file for a content asset may be stored in the cDVR storage system 106. In some implementations, the record event associated with the generation of a manifest file for the content asset may be stored in an cDVR database.

At block 910, the process may generate a plurality of URIs or URLs for a plurality of media segments of the content asset and store them in the manifest file. The naming of the media segments may be deterministic such that manifest files may be created and manipulated prior to the existence of the actual content. The file name for the media segments may contain information on the content source (e.g., source ID, source version), time (e.g., first full second in segmented media represented in UTC time or the like), and bit-rate (e.g., in kbps) and may include additional profile indicators. In some implementations, the duration of segments may be retrieved from one or more records maintained and/or updated by a process associated with the cDVR application 186 during source management, as described above.

For example, a media segment named "CB2A-01-01349007300-1800A.ts" may be generated using the following information:

CB2A=Source ID (52010)

01—primary version of this source (ad zones or blackout zones)

1349007300=09/30/2012 12:15:00 PM GMT (first full second in segment)

1800—1.8 Mbps (1800 kbps)

A—primary profile at this bit-rate (in case there are multiple profiles at the same bit-rate)

The cDVR application 186 may generate a plurality of URIs or URLs using the deterministic naming schema for the requested content asset and store the plurality of URIs or URLs in the manifest file for the requested content asset. A segment name may include information associated with the source of the asset and other relevant information. Additionally, in order to support digital rights management systems, the deterministic naming schema of the media segments may be specified based on the source of the asset and time boundaries, which will direct the client device 110 to a DRM license generator that is capable of determining the appropriate key for the content.

At block 915, the process may generate the manifest file. In some implementations, a manifest file may comprise one or more URIs or URLs of media segments or transport streams associated with the content asset. In some implementations, the manifest file may be generated based upon at least in part the plurality of generated URIs or URLs. In some implementations, multiple manifest files may be generated. For example, a manifest file may be generated for a given bit-rate associated with a particular device-class (e.g., smartphone, tablet, television, etc.). In some implementations, the manifest file may comprise all of the URIs or URLs for each of one or more different profiles (e.g., profiles associated with different device classes).

Additionally, manifest files may include information for encryption (e.g., based on predictable information such as source of the content asset and time associated with a media segment), and URIs or URLs associated with the plurality of media segments for a profile (e.g., profiles associated with different device classes).

At block 920, the process may store the manifest file in the asset directory of the manifest data 240 associated with the requesting user by the cDVR storage system 106. The manifest file may be stored in association with a user account associated with the request to record the content asset. For example, the manifest file may be stored in a directory in cloud storage associated with the user account. In the case of a sub-user, the manifest file may be stored in a sub-directory of a directory associated with the user account.

The generation of the manifest file may happen in near proximity to the beginning of the recording of the asset. The generation of the manifest file may happen any time after the asset has been scheduled to be recorded and prior to the broadcast or airing of the asset. In some implementations, after the manifest file has been created and stored in the asset directory associated with the user, the record event may be removed from the cDVR storage system 106.

According to some implementations, segmented recording operating in common copy mode provides the ability to very efficiently record a single copy of a given segment of content, regardless of the lack of alignment of start and stop times across recordings. As such, in common copy mode, the super set of segments are captured, and each recording may be associated with a unique set of segments. It would be beneficial if this efficiency was also extended to playout, where the CDN would be able to cache commonly recorded segments across recordings. However, this requires a slight modification to the generation of manifests.

As one example, currently, the URL to the master manifest is encoded with the content ID. As such, the source can be uniquely sourced and associated with the manifest and facilitate the means by which the recording can be uniquely identified from a DRM encryption perspective. The following is an example of a URL to a master manifest for a recording:

<baseURL>/<contentID>/<contentID>.m3u8

According to some implementations, the associated variant playlists, that are referenced from the master manifest/playlist (via relative referenced), one per representation in the recording, have the following pattern of request from the client:

<baseURL>/<contentID>/<profile>.m3u8

According to some implementations, the segments are referenced in the variant playlist (via relative referenced) and the client requests have the following pattern:

<baseURL>/<contentID>/<profile>/<segment>.ts

In some implementations, the <profile> is analogous to representation or playback profile. In some implementations, the <segment> is usually a sequence number. In some implementations, the <baseURL> is a combination of a <hostname> and <basePath>.

The above URL formats provide a convenient means by which a segment request can be properly matched to the source and the appropriate encryption keys. Unfortunately, this scheme will not work when segments are shared between when operating in common copy mode.

In order to achieve the goal of having segments shared and cached across different recordings of the same content (from the same source channel), the URL syntax may be modified such that segments are placed and referenced in a common path. Similarly, encryption handling for DRM protection of content may be modified such that content is uniquely encrypted within that folder, rather than uniquely per recording.

Even if the aforementioned problems are solved it is advantageous to maintain some entropy when encrypting segments from a given source over time. One solution would be to extend the linear key rotation implementation to cDVR common copy content. However, the proposed solution instead uses an encryption windows to change an encryption key on fixed window intervals, based on the start time of a given recording. In this way, all recordings that share a start time within a given encryption window and have common segments, will share those segments from an encryption and caching perspective.

In some implementations, the URL or URI of a master manifest has the following format.

<baseURL>/eidkencryptID>/rid-<contentID>.m3u8

For example, much like unique copy operation, the master manifest may be unique for a given recording. In some implementations, the URL or URI of the associated representation manifest (e.g., variant HLS playlist, one per profile/representation) has the following format:

<baseURL>/eid/<encryptID>/rid-<contentID>rep-<profile>.m3u8

For example, the representation manifest is also unique per recording. According to some implementations, the URL or URI of a referenced segment, which can then be shared across recordings, has the following format:

<baseURL>/eidkencryptID>/<other_key>/<other_value>/repidkprofile>/ptsksegm ent>.ts In some implementations, the <other_key>/<other_value> pair is a placeholder for various segment attributes such as batch number, start time, bit-rate, etc. According to some implementations, the above URLs use key-value style URLs. As will be appreciated by one of ordinary skill in the art, the location and number of key-value pairs in the above URLs may be different in other various implementations. In the case of manifest files, the key-value style encoding is used within the filename, with a "_" (e.g., a double underscore) delimiter when required. Alternatively, in some embodiment the above URLs may also be formatted as positional URLs in place of the key-value style.

According to some implementations, if there is need to support derivative top-level manifests (a variant top-level manifest is not to be confused with HLS variant playlist which is described above), a different key-value pair can be used to denote this. According to some implementations, the URL or URI of a derivative top-level manifest, where <variant> can be tablet, STB, mobile, etc., has the following format:

<baseURL>/eidkencryptID>/rid-<contentID>var-<variant>.m3u8

According to some implementations, the desired outcome is to produce individual recordings that have at least the following properties: (1) the segments are cacheable across multiple personalized recordings; (2) the individual assets are encrypted in a manner similar to VOD (e.g., a single key for duration of asset, regardless of stop/start time); and (3) support for recording-in-progress playout.

Figure 10:
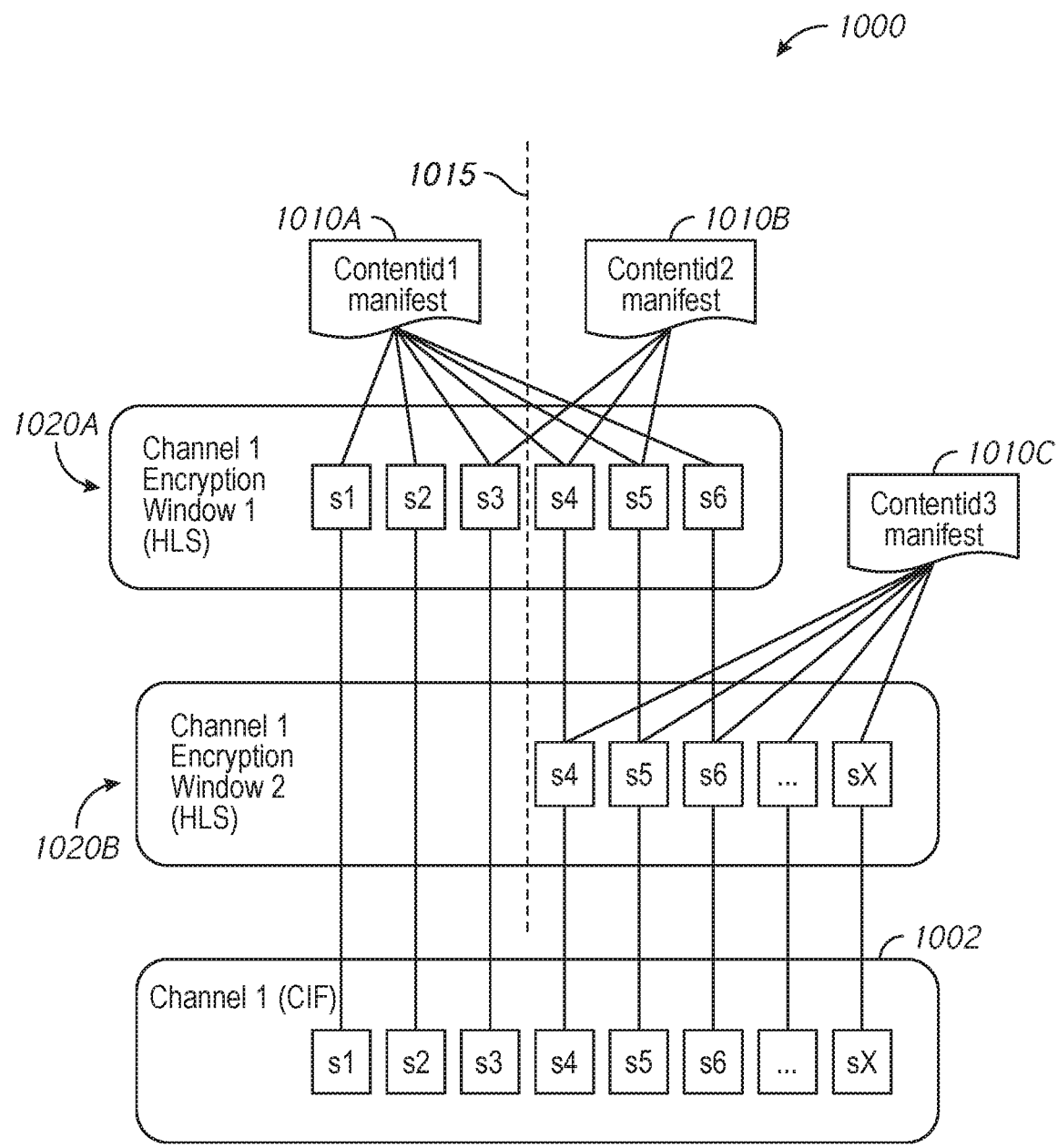
FIG. 10 shows a diagram where segments are shared across multiple manifest according to some implementations.

FIG. 10 shows a diagram 1000 where segments are shared across multiple manifest according to some implementations. As shown in FIG. 10, data 1002 associated with channel 1 includes a plurality of segments s1, s2, s3, s4, s5, s6, . . . sX is stored in common copy mode. In the example shown in FIG. 10, a first recording 1010A associated with Content $ID_1$ includes segments s1, s2, s3, s4, s5, and s6. A second recording 1010B associated with Content $ID_2$ includes segments s3, s4, and s5. A third recording 1010A associated with Content $ID_3$ includes segments s4, s5, s6, . . . and sX.

In the example shown in FIG. 10, the first recording 1010A and the second recording 1010B fall within a first encryption window 1020A because both recordings have start times that occur before the interval change 1015. For example, segments s1 and s3 occur prior to the interval change 1015. Therefore, the URL and encryption of the segments associated with the first recording 1010A (e.g., s1, s2, s3, s4, s5, and s6) and the second recording 1010B (e.g., s3, s4, and s5) will be common.

In the example shown in FIG. 10, the third recording 1010A falls within a second encryption window 1020B because its start time occurs after the interval change 1015. For example, segment s4 occurs after the interval change 1015. As such, the URL and encryption of the segments associated with the third recording 1010C (e.g., s4, s5, s6, . . . , and sX) will be different from the URL and encryption of the segments associated the first recording 1010A and the second recording 1010B.

As one example, segments s4 and s5 are common between the first recording 1010A, the second recording 1010B, and the third recording 101C. However, they will have to be packaged twice: (1) when requested according to content $ID_1$/content $ID_2$, and (2) when requested according to content $ID_3$.

For example, if the second recording 1010B was later changed to start at from s4, the second recording 1010B would then fall within the second encryption window 1020B. As such, the URL and encryption of the segments associated with the second recording 1010B (e.g., s4, s5) would change to be common with the URL and segments of the third recording 1010C (e.g., s4, s5, s6, . . . , and sX).

According to some implementations, the interval change 1015 corresponds a fixed window size (e.g., 4 hours). In some implementations, the fixed window size is selected to align with DRM recommendations regarding how frequent keys should be rotated for linear content.

According to some implementations, the value of the fixed window size of this parameter can be calculated by combining a string value of source ID parameter with the epoch seconds of the encryption window. The encryption window is determined by rounding down the recording timestamp in seconds of the nearest window timestamp.

i=4 hours
<encWin>=(div(epochtime(startTimeStamp), i*3600)) *i*3600
"div" function is integer division.
<encryptID>=<encWin>+"-"+<source>

In some implementations, unique copy mode will leverage the <contentID> value in place of the calculation above for <encryptID>. In other words, <encryptID>=<contentID> for unique copy mode.

Figure 11:
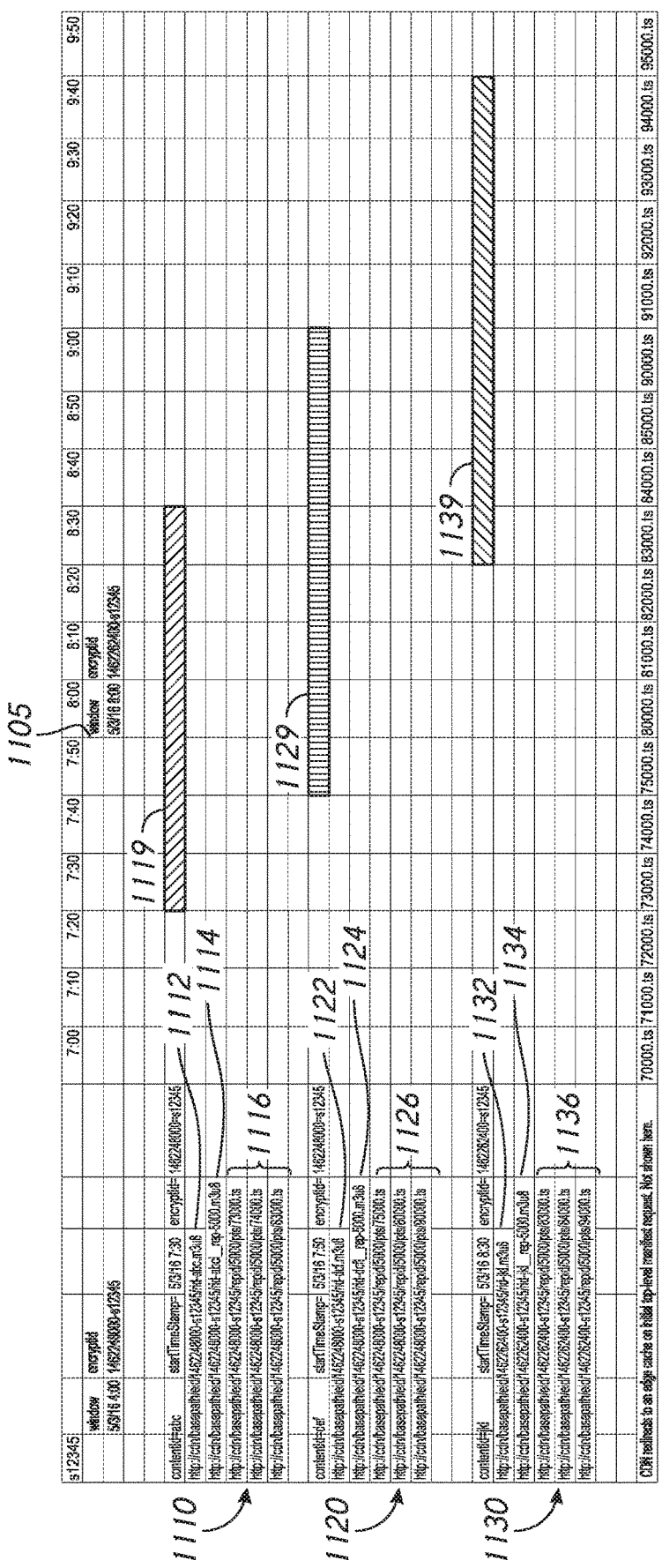
FIG. 11 shows example manifests according to some implementations.

FIG. 11 shows example manifests according to some implementations. As shown in FIG. 11, a first manifest 1110 associated with a first recording 1119 includes a master manifest URL 1112, a representation manifest URL 1114, and a plurality of example segment URLs 1116. Similarly, a second manifest 1120 associated with a second recording 1129 includes a master manifest URL 1122, a representation manifest URL 1124, and a plurality of example segment URLs 1126. Similarly, a third manifest 1130 associated with a third recording 1139 includes a master manifest URL 1132, a representation manifest URL 1134, and a plurality of example segment URLs 1136. According to some implementations, the formats of the various URLs associated with the first manifest 1110, the second manifest 1120, and the third manifest 1130 follow the formats described above for common copy mode.

As shown in FIG. 11, the first segment associated with the first recording 1119 (e.g., 73000.ts) and the first segment associated with the second recording 1129 (e.g., 75000.ts) occur prior to the interval change 1105. Thus, the various URLs associated with the first manifest 1110 and the second manifest 1120 share a common <encryptID> (e.g., 1462248000-s12345).

As shown in FIG. 11, the first segment associated with the third recording 1139 (e.g., 83000.ts) occurs after the interval change 1105. Thus, the various URLs associated with the third manifest 1130 has a different <encryptID> (e.g., 1462262400-s12345) than the <encryptID> associated with the first manifest 1110 and the second manifest 1120.

Figure 12:
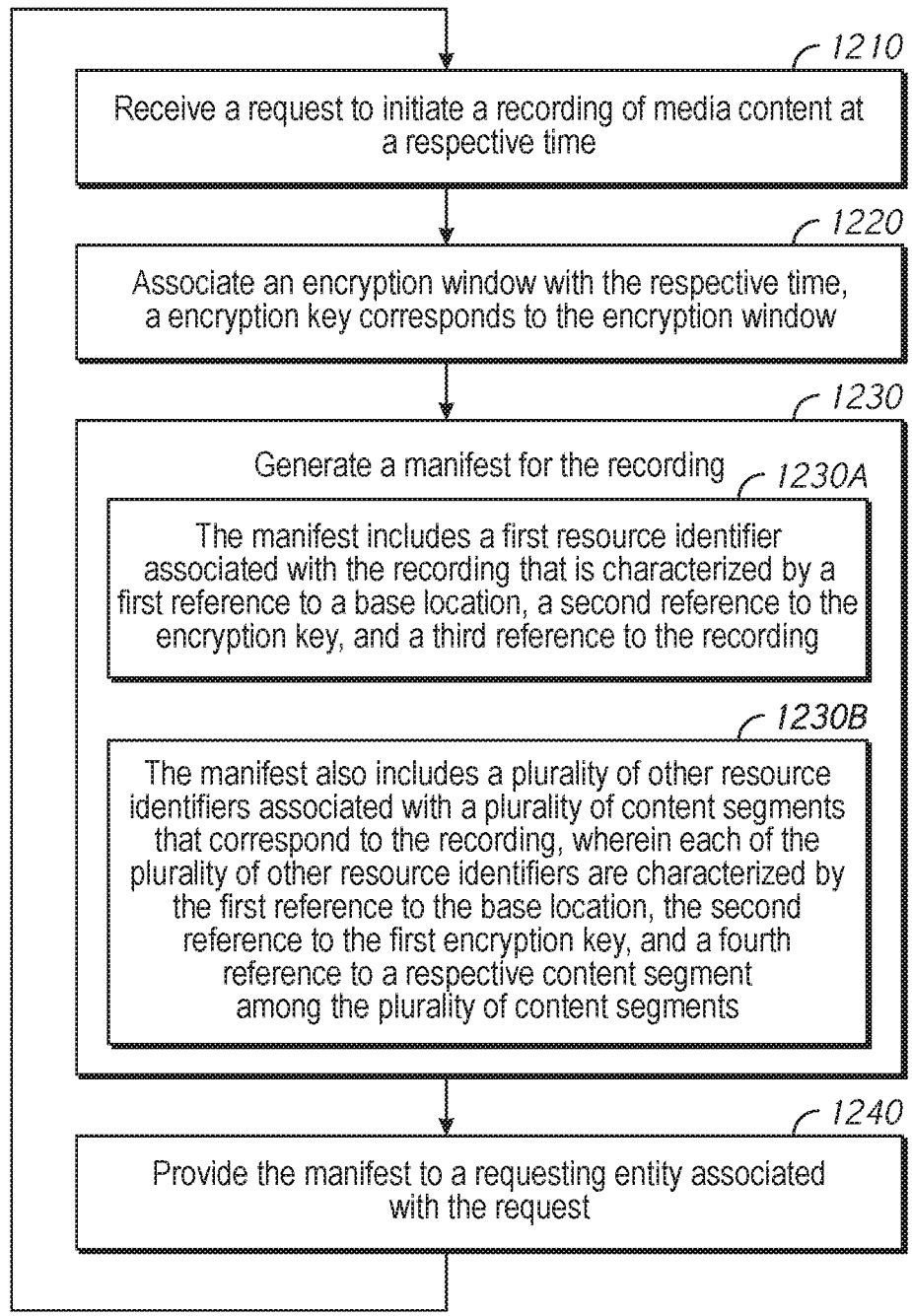
FIG. 12 is a flowchart of a method of a generating manifest file for playback in the cDVR operating environment in accordance with some implementations.

FIG. 12 is a flowchart representation of a method of a recording request in accordance with some implementations. In some implementations (and as detailed below as an example), the method 1200 is performed by a device, such as the recorder module 220 in FIG. 2, or a suitable combination of the cDVR server 112 and/or the cDVR storage system 106 in FIG. 1. In some implementations, the method 1200 is performed by processing logic, including hardware, firmware, software, or a combination thereof. In some implementations, the method 1200 is performed by a processor executing code stored in a non-transitory computer-readable medium (e.g., a memory).

The method 1200 begins, in block 1210, with the device receiving a request to initiate a recording of media content at a respective time. For example, with reference to FIG. 11, the first recording 1119 starts at 7:20. In some implementations, the media content corresponds to a linear video stream or a video-on-demand (VOD) channel.

At block 1220, the device associates an encryption window with the respective time, where a particular encryption key corresponds to the encryption window. For example, with reference to FIG. 11, the first recording 1119 falls within an encryption window associated with recordings starting before the interval change 1105. In this example, the encryption key that corresponds to the encryption window before the interval change 1105 is associated with <encryptID>=1462248000-s12345.

At block 1230, the device generates a manifest for the recording. For example, with reference to FIG. 11, the first recording 1119 is associated with the first manifest 1110 that includes the master manifest URL 1112, the representation manifest URL 1114, and the plurality of example segment URLs 1116.

In some implementations, at block 1230A, the manifest includes a first resource identifier associated with the recording that is characterized by a first reference to a base location, a second reference to the encryption key, and a third reference to the recording. In some implementations, the base location corresponds to a content delivery network (CDN) or a particular content delivery server. In some implementations, the second and third references correspond to key-value pairs. In some implementations, the third reference to the recording corresponds to a unique identifier corresponding to the recording. In some implementations, a recording is associated with a unique content ID. As such, according to some implementations, a recording may be associated with a unique manifest even though the encryption key and/or content segment URLs may be shared across segments. In some implementations, the first resource identifier associated with the recording follows the following format:

<baseURL>/eid/<encryptID>/rid-<contentID>.m3u8

For example, with reference to FIG. 11, the first recording 1119 is associated with the first manifest 1110 that includes the master manifest URL 1112. In this example, the first reference to the base location corresponds to the string: http://cdn/basepath. In this example, the second reference to encryption key corresponds to the key-value pair represented by the string: eid/1462248000-s12345. In this example, the third reference to first recording corresponds to the key-value pair represented by the string: rid-abc.

In some implementations, at block 1230B, the manifest also includes a plurality of other resource identifiers associated with a first plurality of content segments that correspond to the recording, wherein each one or more other resource identifiers may be characterized by the first reference to the base location, the second reference to the first encryption key, and a fourth reference to a respective content segment among the plurality of content segments. In some implementations, each one or more other resource identifiers may be characterized by a reference to a playback profile. In some implementations, the first resource identifier corresponds to a uniform resource locator (URL), and each one or more other resource identifiers corresponds to a URL. In some implementations, each one or more other resource identifiers follows the following format:

<baseURL>/eidkencryptID>/<other_key>/<other_value>/repidkprofile>/ptsksegm ent>.ts For example, with reference to FIG. 11, the first recording 1119 is associated with the plurality of example segment URLs 1116. In this example, the first reference to the base location corresponds to the string: http://cdn/basepath. In this example, the second reference to encryption key corresponds to the key-value pair represented by the string: eid/1462248000-s12345. In this example, with reference to first example segment URL among the plurality of plurality of example segment URLs 1116, the fourth reference to the respective content segment corresponds to the key-value pair represented by the string: pts/73000.

At block 1240, the device provides the manifest to a requesting entity associated with the request. In some implementations, the requesting entity corresponds to a client device. In some implementations, the requesting entity corresponds to a scheduling agent.

Following block 1240, the method 1200 returns to block 1210 where additional recoding requests can be received by the device.

Figure 13:
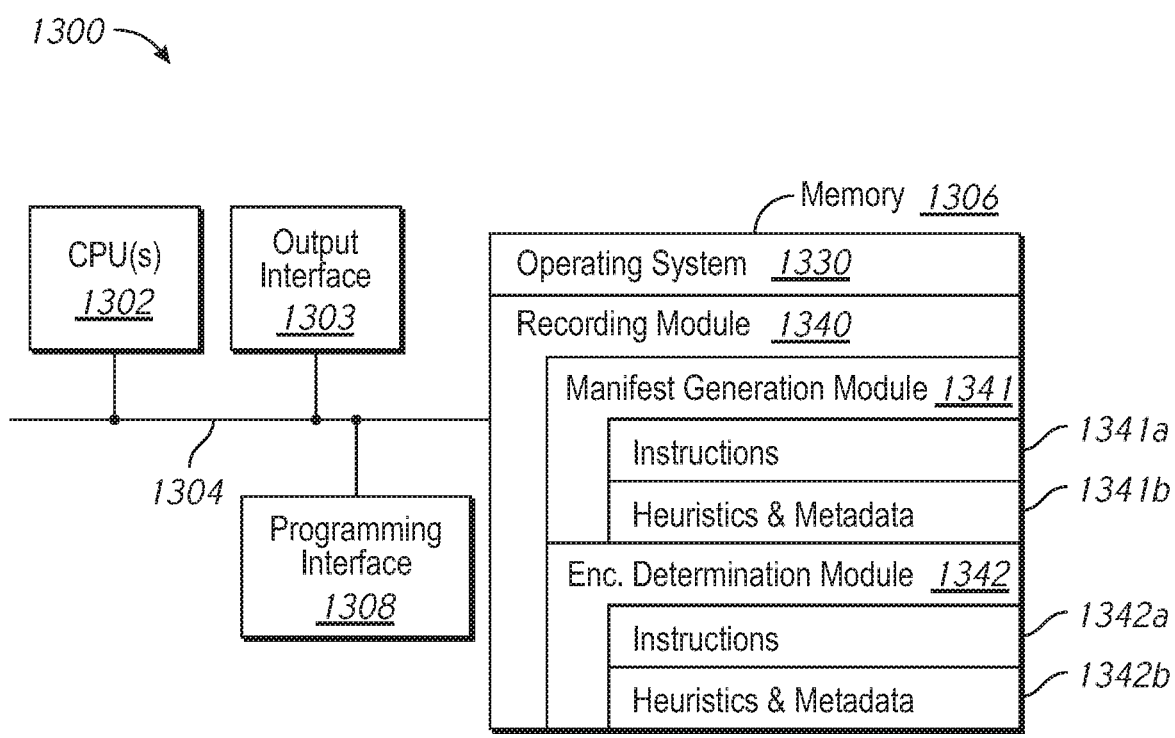
FIG. 13 is a block diagram of a computing device 1300 in accordance with some implementations.

FIG. 13 is a block diagram of a computing device 1300 in accordance with some implementations. In some implementations, the computing device 1300 corresponds to the recorder module 220 in FIG. 2 and performs one or more of the functionalities described above with respect to the recorder module 220. In some implementations, the computing device 1300 corresponds to a suitable combination of the cDVR server 112 and/or the cDVR storage system 106 in FIG. 1 and performs one or more of the functionalities described above with respect to the cDVR server 112 and/or the cDVR storage system 106. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations the computing device 1300 includes one or more processing units (CPUs) 1302 (e.g., processors), one or more output interfaces 1303 (e.g., a network interface), a memory 1306, a programming interface 1308, and one or more communication buses 904 for interconnecting these and various other components.

In some implementations, the communication buses 1304 include circuitry that interconnects and controls communications between system components. The memory 1306 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 1306 optionally includes one or more storage devices remotely located from the CPU(s) 1302. The memory 1306 comprises a non-transitory computer readable storage medium. Moreover, in some implementations, the memory 1306 or the non-transitory computer readable storage medium of the memory 1306 stores the following programs, modules and data structures, or a subset thereof including an optional operating system 1330 and a recording module 1340. In some implementations, one or more instructions are included in a combination of logic and non-transitory memory. The operating system 1330 includes procedures for handling various basic system services and for performing hardware dependent tasks. In some implementations, the recording module 1340 is configured to handle requests relating to recording segments of video data. To that end, the recording module 1340 includes a manifest generation module 1341 and an encryption determination module 1342.

In some implementations, the manifest generation module 1341 is configured to generate a manifest for a given recording. To that end, the interface module 1341 includes a set of instructions 1341*a* and heuristics and metadata 1341*b*.

In some implementations, the encryption determination module 1342 is configured to determine an encryption window associated with a given recording, the encryption window corresponding to an encryption key used when generating the manifest. To that end, the database module 1342 includes a set of instructions 1342*a* and heuristics and metadata 1342*b*.

Although the recording module 1340, the manifest generation module 1341, and the encryption determination module 1342 are illustrated as residing on a single computing device 1300, it should be understood that in other embodiments, any combination of the recording module 1340, the manifest generation module 1341, and the encryption determination module 1342 can reside in separate computing devices in various implementations. For example, in some implementations, each of the recording module 1340, the manifest generation module 1341, and the encryption determination module 1342 may reside on a separate computing device.

Moreover, FIG. 13 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 13 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 14:
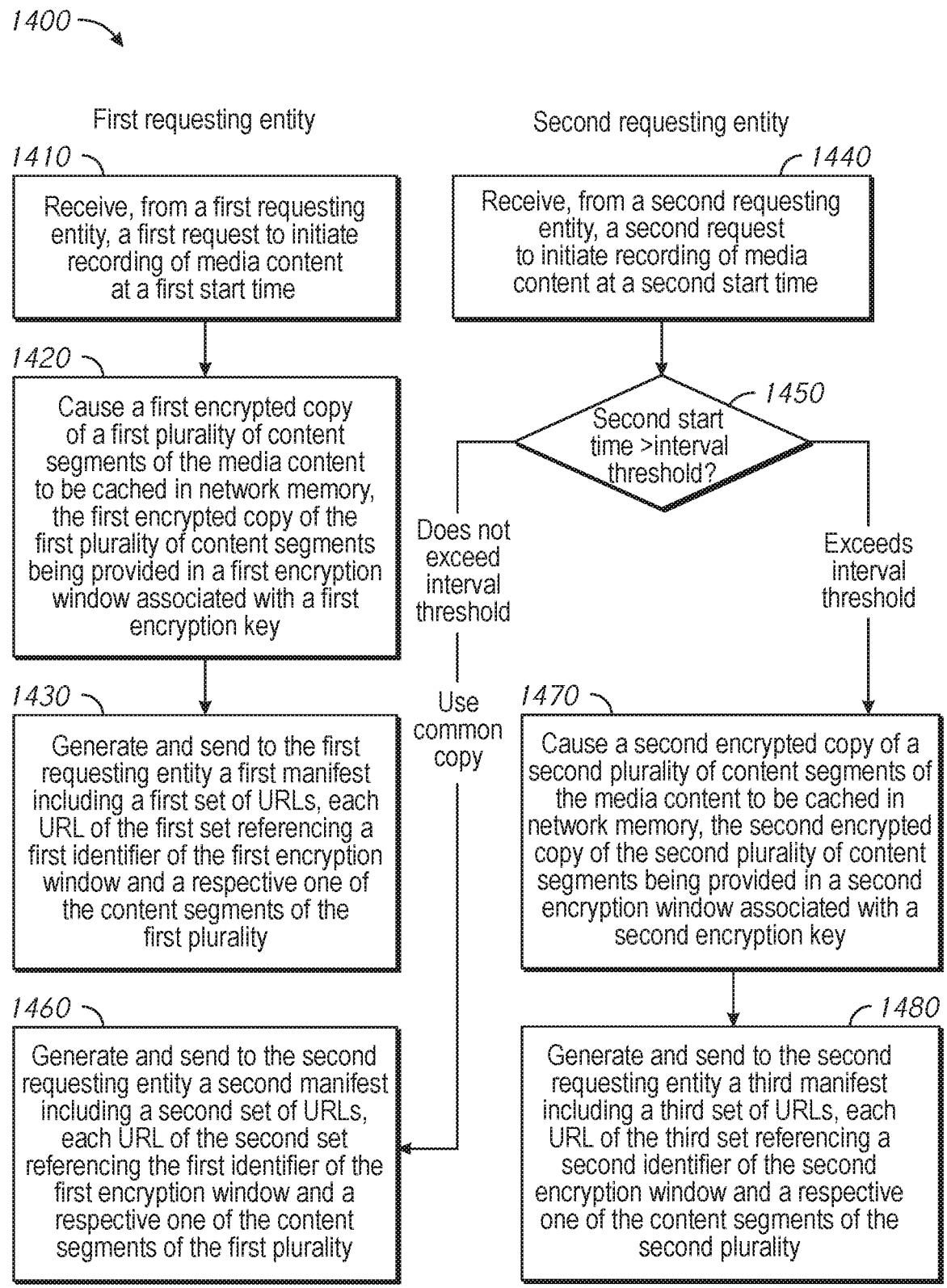
FIG. 14 is a flowchart of a method for use in facilitating segmented video delivery in the cDVR operating environment in accordance with some implementations.

FIG. 14 is a flowchart 1400 of a method for use in facilitating segmented video delivery in the cDVR operating environment in accordance with some implementations. In some implementations, the method of flowchart 1400 is performed by a device, such as the recorder module 220 in FIG. 2, or a suitable combination of the cDVR server 112 and/or the cDVR storage system 106 in FIG. 1. In some implementations, the method of flowchart 1400 is performed by processing logic, including hardware, firmware, software, or a combination thereof. In some implementations, the method of flowchart 1400 is performed by a processor executing code stored in a non-transitory computer-readable medium (e.g., a memory). In at least some ways, the method of flowchart 1400 may be viewed as recharacterization of techniques described earlier above.

The flowchart 1400 of FIG. 1400 begins with the device interacting with a first requesting entity. In block 1410, the device receives, from the first requesting entity, a first request to initiate recording of media content at a first start time. In response to receiving the first request, in block 1420 the device causes a first encrypted copy of a first plurality of content segments of the media content to be cached in network memory. The first encrypted copy of the first plurality of segments is associated with a first encryption window associated with a first encryption key.

In block 1430, the device generates and sends to the first requesting entity a first manifest which includes a first set of URLs. The URLs of the first set are for use in retrieving content segments of the media content in a segmented video delivery, where URLs of the first set reference a first identifier of the first encryption widow and a respective one of the content segments of the first plurality. A reference to a content segment may be a relative reference, such as a reference by timestamp or sequence number. URLs may also include a reference to a representation identifier of a plurality of representations of the content segments.

The segmented video delivery may be facilitated in accordance with HTTP Live Streaming (HLS), HTTP Smooth Streaming (HSS), Dynamic Adaptive Streaming over HTTP (DASH), or the like.

Next, the flowchart 1400 of FIG. 14 continues with the device interacting with a second requesting entity. In block 1440, the device receives, from the second requesting entity, a second request to initiate recording of media content at a second start time. In block 1450, it is identified whether the second request is received at a second start time that exceeds an interval threshold. In response to receiving the second request when the second start time does not exceed the interval threshold as tested in block 1450, the device refrains from causing an additional copy of content segments of the media content to be cached, and in block 1460 the device generates and sends to the second requesting entity a second manifest which includes a second set of URLs. The URLs of the second set are for use in retrieving content segments of the media content in a segmented video delivery, where URLs of the second set reference the first identifier of the first encryption widow and a respective one of the content segments of the first plurality.

In this case in block 1460, content segments of the media content may be shared between the first and the second requesting entities. URLs in first and second manifests for the first and the second requesting entities may be identical for reference to the same content segments.

In response to receiving the second request when the second start time exceeds the interval threshold as tested in block 1450, in block 1470 the device causes a second encrypted copy of a second plurality of content segments of the media content to be cached in the network memory. The second encrypted copy of the second plurality of segments are associated with a second encryption window associated with a second encryption key. In block 1480, the device generates and sends to the second requesting entity a third manifest which includes a third set of URLs. The URLs of the third set are for use in retrieving content segments of the media content in a segmented video delivery, where URLs of the third set reference a second identifier of the second encryption widow and a respective one of the content segments of the second plurality. Again, a reference to a content segment may be a relative reference, such as a reference by timestamp or sequence number. URLs may also include a reference to a representation identifier of a plurality of representations of the content segments.

Note that, in the case of block 1460, the second requesting entity will share content segments with the first requesting entity using a common copy. Additional requesting entities that submit additional requests to initiate additional recordings of the media content at start times that do not exceed the interval threshold—even 10's, 100's, or 1000's, etc. of additional ones—may also share using the common copy.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Such a computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A method comprising:
   receiving, from a first requesting entity, a first request to initiate recording of media content at a first start time;
   in response to receiving the first request,
      causing a first encrypted copy of a first plurality of content segments of the media content that is referenced by a first set of segment Uniform Resource Locators (URLs) to be cached in network memory, wherein the first set of segment URLs references a first encryption key that is calculated as a function of a first encryption window and URLs of the first set reference a respective one of the content segments of the first plurality;
      generating, and sending to the first requesting entity, a first manifest, wherein the first manifest includes first manifest URLs for recording of the media content in response to the first request and the first set of segment URLs, and the first manifest URLs reference the first encryption key;
   receiving, from a second requesting entity different from the first requesting entity, a second request to initiate recording of the media content at a second start time; and
   in response to receiving the second request when the second start time does not exceed an interval threshold from the first start time,
      generating, and sending to the second requesting entity, a second manifest, wherein the second manifest includes second manifest URLs for recording of the media content in response to the second request and a second set of segment URLs, the second manifest URLs reference the first encryption key, and URLs of the second set reference the first encryption key and a respective one of the content segments of the first plurality.

2. The method of claim 1 wherein the first encrypted copy of the first plurality of content segments associated with the first encryption window comprises content segments that are shared between the first and the second requesting entities.

3. The method of claim 1, further comprising:
   in response to receiving the second request when the second start time exceeds the interval threshold from the first start time,
      causing a second encrypted copy of a second plurality of content segments of the media content to be cached in the network memory, the second encrypted copy of the second plurality of content segments being associated with a second encryption window associated with a second encryption key; and
      generating, and sending to the second requesting entity, a third manifest including a third set of URLs, wherein URLs of the third set reference a second identifier of the second encryption window and a respective one of the content segments of the second plurality.

4. The method of claim 1, for use in cloud-enabled, network-based digital video recording (cDVR).

5. The method of claim 1, wherein the media content is communicated in accordance with a segmented video delivery, such as HTTP Live Streaming (HLS), HTTP Smooth Streaming (HSS), or Dynamic Adaptive Streaming over HTTP (DASH).

6. The method of claim 1, wherein URLs of the first and second sets reference a respective one of the content segments by timestamp or sequence number.

7. The method of claim 1, wherein URLs of the first set reference a representation identifier of a representation of the content segments.

8. A device comprising
a network interface;
one or more processors; and
a non-transitory memory comprising instructions that when executed cause the one or more processors to perform operations comprising:
receiving, from a first requesting entity, a first request to initiate recording of media content at a first start time;
in response to receiving the first request,
causing a first encrypted copy of a first plurality of content segments of the media content that is referenced by a first set of segment Uniform Resource Locators (URLs) to be cached in network memory, wherein the first set of segment URLs references a first encryption key that is calculated as a function of a first encryption window and URLs of the first set reference a respective one of the content segments of the first plurality;
generating, and sending to the first requesting entity, a first manifest, wherein the first manifest includes first manifest URLs for recording of the media content in response to the first request and the first set of segment URLs, and the first manifest URLs reference the first encryption key;
receiving, from a second requesting entity different from the first requesting entity, a second request to initiate recording of the media content at a second start time; and
in response to receiving the second request when the second start time does not exceed an interval threshold from the first start time,
generating, and sending to the second requesting entity, a second manifest, wherein the second manifest includes second manifest URLs for recording of the media content in response to the second request and a second set of segment URLs, the second manifest URLs reference the first encryption key, and URLs of the second set reference the first encryption key and a respective one of the content segments of the first plurality.

9. The device of claim 8, wherein the one or more processors perform operations further comprising:
in response to receiving the second request when the second start time exceeds the interval threshold from the first start time,
causing a second encrypted copy of a second plurality of content segments of the media content to be cached in the network memory, the second encrypted copy of the second plurality of content segments being provided in a second encryption window associated with a second encryption key; and
generating, and sending to the second requesting entity, a third manifest including a third set of URLs, wherein URLs of the third set reference a second identifier of the second encryption window and a respective one of the content segments of the second plurality.

10. A method comprising:
receiving a first request to initiate a first recording of media content at a first start time;
associating a first encryption window with the first start time based on the first start time and an interval change corresponding to the first encryption window in response to receiving the first request, wherein a first encryption key corresponds to the first encryption window;
generating a first manifest for the first recording based on the first encryption key, wherein the first manifest for the first recording includes first manifest Uniform Resource Locators (URLs) for the first recording and a first set of segment URLs, the first set of segment URLs references a first plurality of content segments that correspond to the first recording encrypted based on the first encryption key, the first manifest URLs reference the first encryption key, and a manifest URL of the first manifest URLs is characterized by a first reference to a base location, a second reference to the first encryption key, and a third reference to the first recording; and
providing the first manifest to a first requesting entity associated with the first request.

11. The method of claim 10, wherein the first manifest also includes a first plurality of other resource identifiers associated with the first plurality of content segments that correspond to the first recording, wherein each one or more other resource identifiers are characterized by the first reference to the base location, the second reference to the first encryption key, and a fourth reference to a respective content segment among the first plurality of content segments.

12. The method of claim 11, wherein the first resource identifier corresponds to a URL, and wherein each one or more other resource identifiers correspond to URLs.

13. The method of claim 11, wherein each one or more other resource identifiers are characterized by a reference to a playback profile.

14. The method of claim 10, wherein the first requesting entity corresponds to a client device or a scheduling agent.

15. The method of claim 10, wherein the base location corresponds to a content delivery network (CDN) or a particular content delivery server.

16. The method of claim 10, wherein each of the second and third references correspond to key-value pairs.

17. The method of claim 11, further comprising:
receiving a second request to initiate a second recording of the media content at a second time;
associating the first encryption window with the second time in response to receiving the second request;
generating a second manifest for the second recording based on the first encryption key and a second plurality of content segments that correspond to the second recording; and
providing the second manifest to a second requesting entity associated with the second request, wherein the second manifest includes a second resource identifier associated with the second recording that is characterized by the first reference to the base location, the second reference to the first encryption key, and a fifth reference to the second recording.

18. The method of claim 17, wherein the second manifest also includes a second plurality of other resource identifiers associated with the second plurality of content segments that correspond to the second recording, wherein each one or more other resource identifiers of the second plurality are characterized by the first reference to the base location, the second reference to the first encryption key, and a sixth reference to a respective content segment among the second plurality of content segments.

19. The method of claim 18, wherein the first plurality of content segments and the second plurality of content segments include at least one common segment.

20. The method of claim 17, further comprising:
receiving a third request to initiate a third recording of the media content at a third time;
associating a second encryption window with the third time in response to receiving the third request, wherein a second encryption key corresponds to the second encryption window;
generating a third manifest for the third recording based on the second encryption key and a third plurality of content segments that correspond to the third recording; and
providing the third manifest to a third requesting entity associated with the third request,
wherein the third manifest includes a third resource identifier associated with the third recording that is characterized by the first reference to the base location, a seventh reference to the second encryption key, and an eighth reference to the third recording.

\* \* \* \* \*